United States Patent
Ino et al.

(10) Patent No.: US 6,201,891 B1
(45) Date of Patent: Mar. 13, 2001

(54) X-RAY IMAGING APPARATUS AND RECORDING MEDIUM THEREFOR

(75) Inventors: Yoshihiro Ino, Kawanishi; Toshiyoshi Yamamoto, Sanda; Koichi Ohmori, Toyonaka; Yasuhiko Shinkaji, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/361,097

(22) Filed: Jul. 26, 1999

Related U.S. Application Data

(62) Division of application No. 08/882,705, filed on Jun. 25, 1997, now Pat. No. 5,974,166.

(30) Foreign Application Priority Data

Jun. 26, 1996 (JP) .................................................. 8-165652
Sep. 13, 1996 (JP) .................................................. 8-242764
Feb. 28, 1997 (JP) .................................................. 9-45890

(51) Int. Cl.$^7$ ......................................................... G06K 9/00
(52) U.S. Cl. ................................................................. 382/132
(58) Field of Search .................................... 382/132, 274; 128/922; 378/62, 70, 98.7

(56) References Cited

U.S. PATENT DOCUMENTS

| | | | |
|---|---|---|---|
| 3,662,274 | * 5/1972 | Pritchard et al. | 329/192 |
| 4,852,002 | * 7/1989 | Klausz | 364/413.13 |
| 5,164,993 | * 11/1992 | Capozzi et al. | 382/6 |
| 5,204,888 | 4/1993 | Tamegai et al. | 378/53 |
| 5,331,166 | 7/1994 | Yamamoto et al. | 250/370.11 |
| 5,454,053 | * 9/1995 | Okubo et al. | 382/270 |
| 5,493,622 | * 2/1996 | Tsuchino et al. | 382/132 |
| 5,796,865 | * 8/1998 | Aoyama et al. | 382/169 |
| 5,894,129 | 4/1999 | Pool | 250/370.09 |

FOREIGN PATENT DOCUMENTS

| | | | |
|---|---|---|---|
| 4-239886 | 8/1992 | (JP) | H04N/5/335 |
| 5-130990 | 5/1993 | (JP) | A61B/6/14 |

* cited by examiner

*Primary Examiner*—Andrew W. Johns
(74) *Attorney, Agent, or Firm*—Sheridan Ross P.c.

(57) ABSTRACT

An X-ray imaging apparatus of the present invention is configured so that image data outputting means receives X-rays and outputs image data containing plural pixels, and, when a pixel value of a designated pixel in the image data is larger than a maximum pixel value of pixels surrounding the designated pixel by a predetermined value or more, abnormal data eliminating means judges the designated value as an abnormal data and corrects the abnormal data, thereby an optimum image quality adjustment is automatically conducted in accordance with an exposure object.

3 Claims, 23 Drawing Sheets

X-RAY IMAGING APPARATUS AND RECORDING MEDIUM THEREFOR

RELATED APPLICATION

This application is a divisional of U.S. patent application Ser. No. 08/882,705, filed Jun. 25, 1997 now U.S. Pat. No. 5,974,166.

BACKGROUND OF THE INVENTION

The present invention relates to an X-ray imaging apparatus using a CCD sensor, and particularly to an X-ray imaging apparatus which displays an image on a CRT or the like by means of digital processing and without using a film, and a recording medium constituting the apparatus. The X-ray imaging apparatus of the present invention is useful for a medical or dental diagnostic apparatus or an industrial nondestructive inspection apparatus.

A conventional X-ray imaging apparatus uses an X-ray film in order to recognize the internal state of an object of diagnosis, inspection, or the like in the form of an image. Recently, an X-ray imaging apparatus using a CCD sensor has been developed for the purposes such as those of shortening the development time, facilitating the data storage, and preventing data from deteriorating. Such an X-ray imaging apparatus uses a method in which the CCD sensor directly receives X-rays and digitized data are displayed on a CRT. The conventional X-ray imaging apparatus is configured so that the CCD sensor receives light from a material which converts X-rays transmitted through an object part e.g. a diseased part to be examined into light, and image data which are digitized pixel by pixel are displayed on an image display device.

In a conventional X-ray imaging apparatus which uses a CCD sensor in this way, the trouble of development can be decreased as compared with the method used in a former apparatus in which an image is formed by exposing an X-ray film to X-rays, thereby shortening the time required for diagnosis of a diseased part.

The conventional X-ray imaging apparatus using a CCD sensor has advantages that image data are digitized and hence the data are not deteriorated, and that the image data can be collectively stored into a recording medium and hence the space for storing the data can be reduced.

In such a conventional X-ray imaging apparatus, the brightness, the contrast, and the magnification degree of the diseased part on the screen of the image display device can be freely adjusted. Consequently, the apparatus serves as effective auxiliary means for diagnosis or inspection. In the medical and dental fields, particularly, digitization of image data allows such an X-ray imaging apparatus to be useful as an auxiliary to diagnosis. When used in an industrial nondestructive inspection apparatus, such a conventional X-ray imaging apparatus can improve the inspection efficiency and enhance the inspection accuracy.

A CCD sensor used in a conventional X-ray imaging apparatus is configured in the same manner as that used in a video camera or the like, or has a configuration in which the CCD sensor receives visible light, the visible light is converted in real time into an analog signal, and the analog signal is then output. Unlike the conventional CCD sensor used in the video camera or the like, however, a CCD sensor used in an X-ray imaging apparatus is provided with a fluorescent member (a scintillator made of, for example, $Gd_2O_2S$) which converts X-rays into visible light, on the surface of the CCD. Also an X-ray imaging apparatus of another kind in which, in place of such a fluorescent member, a cadmium telluride detecting element (CdTe detecting element) for converting X-rays into electric charges is connected to the surface of the CCD for each pixel is used.

Usually, the inspector observes a still X-ray image obtained by an X-ray imaging apparatus. In a conventional X-ray imaging apparatus, therefore, an analog signal from a CCD sensor is converted into a digital signal by an A/D converter at the timing when X-rays are irradiated, and the digital signal is once accumulated in a memory. Furthermore, an image display device is configured so that the digitized image data are displayed as a still image on a CRT or the like.

In order to know the timing when X-rays are irradiated, a conventional X-ray imaging apparatus which uses a CCD sensor as described above must receive trigger signals notifying the start and end of exposure from an X-ray exposure apparatus.

Next, an example of a conventional X-ray imaging apparatus using a CCD sensor will be described with reference to the accompanying drawings. FIG. 23 is a block diagram showing the whole configuration of a conventional X-ray imaging apparatus using a CCD sensor, and FIG. 24 shows a flow of a procedure conducted from the start of exposure to the display of an image in the conventional X-ray imaging apparatus.

Referring to FIG. 23, an X-ray exposure apparatus 210 irradiates a diseased part which is an exposure object, and an X-ray detection unit 201 receives X-rays 211 which have been transmitted through the exposure object. The X-ray detection unit 201 comprises a CCD element 212, an A/D converter 215, and a CCD driver 216, and supplies a digital image signal 217 corresponding to the X-rays 211, to an accumulation unit 205. The accumulation unit 205 to which the digital image signal 217 is supplied comprises an accumulation value calculation circuit 223 and a frame memory 225.

At the same time when the X-rays 211 are irradiated, the X-ray detection unit 201 outputs an X-ray exposure start trigger signal 241 to an accumulation start circuit 221 of an accumulation start unit 204. Simultaneously with the end of exposure of the X-rays 211, the X-ray detection unit 201 outputs an X-ray exposure end trigger signal 242 to an accumulation stop circuit 230 of an accumulation stop unit 208. At this time, the accumulation stop circuit 230 supplies an accumulation stop instruction signal 231 to the accumulation value calculation circuit 223, and at the same time a display instruction flag 232 to a display instruction circuit 233 of a display instruction unit 209. Upon receiving the display instruction flag 232, the display instruction circuit 233 outputs a display instruction signal 234 to a CPU 235 of an image display unit 238. Upon receiving the display instruction signal 234, the CPU 235 acquires digital image data for display 226 from the frame memory 225, and displays the data on an image display device 237 such as a CRT. As required, digital image data for storage 239 output from the CPU 235 are stored as image data into a storage medium 240.

In FIG. 23, the arrows indicate the X-rays and the flows of the signals, the numeral 213 indicates an analog image signal, the numeral 214 indicates a CCD driving signal, the numeral 222 indicates an accumulation start instruction signal, the numeral 224 indicates an accumulated digital image signal, and the numeral 236 indicates an image display signal.

Referring to FIG. 23, when the X-ray exposure apparatus 210 irradiates the CCD element 212 with the X-rays 211, the CCD element 212 outputs the analog image signal 213 corresponding to an image of the exposure object, to the A/D converter 215. The A/D converter 215 to which the analog image signal 213 is supplied outputs the digital image signal 217.

Simultaneously with exposure of the X-rays 211, the X-ray exposure apparatus 210 outputs the X-ray exposure start trigger signal 241 to the accumulation start circuit 221. The accumulation start circuit 221 always monitors the input state of the X-ray exposure trigger signal 241.

FIG. 24 shows the flow of the procedure conducted from the start of exposure of X-rays to the display of an image in the thus configured X-ray imaging apparatus of the prior art. The accumulation start circuit 221 conducts the process of STEP 2 of the flow shown in FIG. 24. When the X-ray exposure start trigger signal 241 is not input, the accumulation start circuit 221 does not conduct accumulation of image data in STEP 3.

By contrast, when the X-ray exposure start trigger signal 241 is supplied to the accumulation start circuit 221 of the accumulation start unit 204, accumulation of the image data is started in STEP 4. At this time, the accumulation start circuit 221 of the accumulation start unit 204 outputs the accumulation start instruction signal 222 to the accumulation value calculation circuit 223. When the accumulation start instruction signal 222 is input to the accumulation value calculation circuit 223, the circuit converts the digital image signal 217 which is thereafter periodically transmitted, into the accumulated digital image signal 224, and stores the converted signal into the frame memory 225.

Next, the analog image signal 213 which is an output signal from the CCD sensor having the CCD element, and the method of the A/D conversion of the analog image signal 213 in the A/D converter 215 will be briefly described with reference to FIGS. 25 and 26.

FIG. 25 is a view conceptually showing the configuration of pixels in the CCD sensor, and FIG. 26 is a view conceptually showing the method of A/D converting the analog image signal 213 in the CCD sensor.

As shown in FIG. 25, the CCD element sensor has pixels arranged in a predetermined number in both the vertical and lateral directions. As shown in FIG. 26, the CCD sensor always outputs at a constant period the analog image signal containing image data of all the pixels of the CCD sensor. The image data of all the pixels are A/D converted at each period by the A/D converter 215, thereby producing the digital image signal 217. The digital image signal 217 is accumulated and then stored into the frame memory 225. The CPU 235 acquires the digital image data for display 226 which are the stored digital image data, from the frame memory 225, and the acquired image data are displayed on the image display device 237 such as a CRT.

Next, at the same time when exposure of the X-rays 211 is ended, the X-ray exposure apparatus 210 outputs the exposure end trigger signal 242 to the accumulation stop circuit 230. The accumulation stop circuit 230 conducts the process of STEP 5 of the flow shown in FIG. 24, and always monitors the input of the exposure end trigger signal 242. When the exposure end trigger signal 242 is not input, accumulation of image data is continued in STEP 6.

By contrast, when the exposure end trigger signal 242 is supplied to the accumulation stop circuit 230, accumulation of the image data is stopped in STEP 7 of FIG. 24. At this time, the accumulation stop circuit 230 outputs the accumulation stop instruction signal 231 to the accumulation value calculation circuit 223, and at the same time the display instruction flag 232 to the display instruction circuit 233.

When the accumulation stop instruction signal 231 is supplied to the accumulation value calculation circuit 223, the processes of accumulating the digital image signal 217 and storing the accumulated signal into the frame memory 225 are stopped. When the display instruction flag 232 is supplied to the display instruction circuit 233, the display instruction circuit 233 outputs the display instruction signal 234 to the CPU 235. Upon receiving the display instruction signal 234, the CPU 235 acquires the digital image data for display 226 from the frame memory 225, and displays the data on the image display device 237 such as a CRT. As required, the image data are stored into the storage medium 240.

In the conventional X-ray imaging apparatus using a CCD sensor, the processes of displaying an image and storing image data are conducted by the method described above.

X-rays have a unique characteristic that, although with a low probability, X-rays can be transmitted through an irradiated portion through which they should originally be transmitted. X-rays transmitted through such a portion may result in appearing as a white dot on a screen. When an image is directly produced from image data of a digital signal obtained by A/D converting an analog image signal from a CCD sensor, therefore, several white dots appear in the whole of the image. When such image data are used, there arises a problem in that diagnosis cannot be performed with high reliability.

In a conventional X-ray imaging apparatus, the input and output operations for an X-ray exposure apparatus and an image display device are cumbersome, and hence the X-ray exposure apparatus and the image display device must be integrally formed in order to attain higher operability. Consequently, an existing X-ray imaging apparatus using an X-ray film cannot be adapted for the use of a CCD sensor, thereby producing an economic problem that such an apparatus is wasted.

Furthermore, an optimum image quality must rely on the control of the output of an X-ray exposure apparatus. Therefore, a conventional X-ray imaging apparatus has also a problem in that it is difficult to adjust the image quality.

In a conventional X-ray imaging apparatus, the intensity of an X-ray is displayed as it is as an image in the term of brightness. Such an X-ray image is not sufficient as an image which the inspector observes, and must be subjected to a process such as density correction because, in order to obtain an image of the visually highest level, a dark portion is to be displayed more finely than a bright portion and the brightness of the displayed image is to have a range as wide as possible. However, the work of adjusting density and the like while observing an image requires the inspector to have technical skills. Practically, it is difficult to process many images for a short time. This makes a large problem in observation of an X-ray image.

Since image data consist of digital values, the range of the data is finite. When the exposure amount of X-rays exceeds the range or is too large or small, density cannot be adjusted, thereby producing a problem in that an image sufficient for diagnosis cannot be obtained.

A CCD sensor used in an X-ray imaging apparatus is superior in sensitivity to a film, and has superiority in certainty that a sufficient image can be obtained by a small exposure amount, and accuracy. However, a CCD sensor has a problem in that it is very difficult to set conditions for adjusting the exposure time and the exposure distance so as to conform to the sensitivity of the CCD sensor. In the dental field, for example, the transmittance of X-rays is varied depending on the kind of a tooth, i.e., an anterior tooth or a molar tooth, or a tooth of an infant or that of an adult, and hence the exposure amount of X-rays must be set in a different manner. In a conventional X-ray imaging apparatus using a CCD sensor, therefore, test exposure must be repeated until an image is obtained under optimum conditions. In other words, useless exposure must be conducted.

BRIEF SUMMARY OF THE INVENTION

It is an object of the present invention to provide an X-ray imaging apparatus which does not require any input of a trigger signal from an X-ray exposure apparatus, which can automatically detect the start and end of X-ray exposure, thereby eliminating cumbersome operations, which allows a conventional X-ray exposure apparatus to be used, only by removing an X-ray film, and which is economically superior. It is another object of the present invention to provide an X-ray imaging apparatus in which an optimum image quality adjustment is automatically conducted in accordance with an exposure object and without finely adjusting the output of an X-ray exposure apparatus.

In order to attain the objects, the X-ray imaging apparatus of the present invention comprises:

image data outputting means for receiving X-rays, and for outputting image data containing plural pixels; and abnormal data eliminating means for receiving the image data from the image data outputting means, for, when a pixel value indicating a luminance of a designated pixel in the image data is larger than a maximum pixel value of pixels surrounding the designated pixel by a predetermined value or more, judging the designated value as an abnormal data, and for correcting the abnormal data.

In the specification, the term "pixel value" corresponds to the intensity of X-rays at a pixel, and means an analog value such as an electric charge or a current corresponding to the luminance of a pixel of a CCD element, or a digital value corresponding to such an analog value.

In the thus configured X-ray imaging apparatus of the present invention, when the pixel value of a designated pixel is larger by the predetermined value or more than the value of a pixel which has the maximum value among the surrounding pixels, the designated pixel is judged as an abnormal data. Consequently, the apparatus of the present invention can surely judge an abnormal data and is useful for a process of correcting image data.

In the X-ray imaging apparatus of the present invention, when the abnormal data eliminating means judges the designated pixel as an abnormal data, the pixel value of the designated pixel is replaced with a maximum value of the surrounding pixels.

In the X-ray imaging apparatus of the present invention, when the abnormal data eliminating means judges the designated pixel as an abnormal data, the pixel value of the designated pixel is replaced with an average value of the surrounding pixels.

The X-ray imaging apparatus of the present invention comprises:

image data outputting means for receiving X-rays, and for outputting image data containing plural pixels;

image data storing means for storing the image data from the image data outputting means; and abnormal data eliminating means for acquiring the image data stored in the image data storing means, for calculating a luminance distribution curve of a predetermined number of pixels among the image data, for judging a discontinuous portion of the luminance distribution curve in which the curve is not continuous and which is separated from a main portion of the luminance distribution curve by a distance larger than a predetermined value, as an abnormal data, and for correcting the abnormal data.

In the X-ray imaging apparatus of the present invention, therefore, the luminance distribution of a predetermined number of pixels among image data stored in the image data storing means is judged, and, when the luminance distribution is not continuous, a discontinuous portion which is separated from the main portion of the luminance distribution by the predetermined value or more is judged as an abnormal data. Even when abnormal data continuously exist, therefore, the apparatus of the present invention is useful for a process of correcting image data.

In the X-ray imaging apparatus of the present invention, when the abnormal data eliminating means judges the designated pixel as an abnormal data, the pixel value indicating a luminance of the designated pixel is replaced with a maximum pixel value of pixels which are not judged as an abnormal data among pixels surrounding the designated pixel.

In the X-ray imaging apparatus of the present invention, when the abnormal data eliminating means judges the designated pixel as an abnormal data, the pixel value indicating a luminance of the designated pixel is replaced with an average pixel value of pixels which are not judged as an abnormal data among pixels surrounding the designated pixel.

The recording medium of the present invention stores a program which, when a pixel value indicating a luminance of a designated pixel is larger than a maximum pixel value of pixels surrounding the designated pixel by a predetermined value or more, judges the designated value as an abnormal data. Therefore, the recording medium of the present invention is useful for a process of correcting image data, and excellent in portability and storage.

The recording medium of the present invention stores a program which calculates a luminance distribution curve of a predetermined number of pixels among image data, and which judges a discontinuous portion of the luminance distribution curve in which the curve is not continuous and which is separated from a main portion of the luminance distribution curve by a distance larger than a predetermined value, as an abnormal data. Therefore, the recording medium of the present invention is useful for a process of correcting image data, and excellent in portability and storage.

The X-ray imaging apparatus of the present invention comprises:

X-ray detecting means for receiving X-rays, and for outputting a pixel value indicating a luminance of each pixel in image data containing plural pixels, as a digital signal;

accumulating means for accumulating the pixel value for each of the pixels on the basis of plural digital signals from the X-ray detecting means, and for calculating an accumulation value;

accumulation value detecting means for detecting that an accumulation value of the pixel value for each pixel reaches a predetermined value; and first pixel number detecting means for detecting that a number of pixels having an accumulation value which has reached the predetermined value reaches a predetermined number.

Therefore, the X-ray imaging apparatus of the present invention can obtain an optimum image quality on the side of the apparatus itself and without receiving any control from an X-ray exposure apparatus.

The X-ray imaging apparatus of the present invention further comprises first accumulation stopping means for, when the first pixel number detecting means detects that a number of pixels having an accumulation value which has reached the predetermined value reaches the predetermined number, stopping the accumulation of the pixel value.

When the X-ray imaging apparatus of the present invention is subjected to X-ray exposure from which an optimum image quality is attained, therefore, the apparatus can maintain the optimum image quality without stopping the X-ray exposure.

The X-ray imaging apparatus of the present invention further comprises first display instructing means for, when the first pixel number detecting means detects that a number of pixels having an accumulation value which has reached the predetermined value reaches the predetermined number, giving instructions to display an X-ray exposure image on the basis of the accumulation value for each pixel.

Therefore, the X-ray imaging apparatus of the present invention can automatically display an image of the optimum quality.

The X-ray imaging apparatus of the present invention further comprises:
  storing means for storing plural accumulation values for plural accumulations, the plural accumulations being respectively calculated each time when the X-ray detecting means produces an output; and
  second display instructing means for giving instructions to display the X-ray exposure image by using accumulation values for a predetermined number of accumulations, among the accumulation values for plural accumulations in the storing means.

Therefore, the X-ray imaging apparatus of the present invention can select an image which is most suitable for a part to be diagnosed or the diagnosis method, from the accumulation values for plural accumulations.

The X-ray imaging apparatus of the present invention comprises:
  X-ray detecting means for receiving X-rays, and for outputting a pixel value indicating a luminance of each pixel in image data containing plural pixels, as a digital signal;
  pixel value detecting means for detecting that the pixel value of each pixel reaches a predetermined value, on the basis of the digital signal output from the X-ray detecting means;
  second pixel number detecting means for detecting that a number of pixels having a pixel value which has reached the predetermined value reaches a predetermined number; and
  accumulation starting means for, when the second pixel number detecting means detects that a number of pixels having a pixel value which has reached the predetermined value reaches the predetermined number, starting accumulation of the pixel value.

Therefore, the X-ray imaging apparatus of the present invention can judge whether X-ray exposure is appropriate or not, and then automatically start accumulation.

The X-ray imaging apparatus of the present invention comprises:
  X-ray detecting means for receiving X-rays, and for outputting a pixel value indicating a luminance of each pixel in image data containing plural pixels, as a digital signal;
  pixel value detecting means for detecting that the pixel value of each pixel reaches a predetermined value, on the basis of the digital signal output from the X-ray detecting means;
  second pixel number detecting means for detecting that a number of pixels having a pixel value which has reached the predetermined value reaches a predetermined number, and for comparing the detected number with a predetermined number; and
  accumulation stopping means for, when the second pixel number detecting means detects that the number of pixels having a pixel value which has reached the predetermined value fails to reach the predetermined number, stopping accumulation of the pixel value.

Therefore, the X-ray imaging apparatus of the present invention can judge whether X-ray exposure is appropriate or not, and then automatically stop accumulation.

The X-ray imaging apparatus of the present invention comprises:
  signal outputting means for receiving X-rays, and for outputting an analog image signal corresponding to an intensity of the X-rays;
  signal amplifying means for amplifying the analog image signal at different amplification factors in accordance with a level of the analog image signal;
  A/D converting means for converting the amplified analog image signal into a digital value;
  storing means for storing the digital value of the A/D converting means; and
  displaying means for displaying an X-ray image on the basis of the digital value stored in the storing means.

In the X-ray imaging apparatus of the present invention, therefore, the signal outputting means receives X-rays and outputs an analog image signal corresponding to the intensity of the X-rays, and the analog signal is A/D converted into a digital value. A predetermined number or rate of digital values which are higher and lower in level among the digital values of plural pixels or all the pixels are eliminated, and conversion is conducted so that maximum and minimum values of the remaining digital values have respective predetermined values. In the X-ray imaging apparatus of the present invention, conversion into digital values for display is conducted in accordance with conversion characteristics corresponding to the display purpose, and the converted digital values are displayed on a CRT or the like. Consequently, the brightness range of a displayed image can be widened, and an image of the visually highest level can be obtained in accordance with conversion characteristics corresponding to the display purpose. According to the present invention, an apparatus in which the time and the distance for X-ray exposure can be set without difficulty and conditions can be easily set and which is therefore easy to operate can be obtained.

In the X-ray imaging apparatus of the present invention, the signal amplifying means is configured so that, as the analog image signal has a lower level, the amplification factor is larger, and, as the analog image signal has a higher level, the amplification factor is smaller.

In the X-ray imaging apparatus of the present invention, when the signal outputting means receives X-rays and outputs an analog image signal corresponding to the intensity of the X-rays, therefore, the signal amplifying means amplifies the analog image signal at a larger amplification factor as the level of the analog image signal is lower and at a smaller amplification factor as the level of the analog image signal is higher. Consequently, with respect to a portion through which X-rays hardly transmit, i.e., a dark portion, a signal is output in the state where the pixel distribution range is further widened. The analog image signal is A/D converted and then displayed on a CRT or the like. As a result, a dark image portion can be displayed more finely than a bright portion and an image of the visually highest level can be obtained.

The X-ray imaging apparatus of the present invention comprises:

signal outputting means for receiving X-rays, and for outputting an analog image signal corresponding to an intensity of the X-rays;

signal amplifying means for amplifying the analog image signal;

A/D converting means for converting the amplified analog image signal into a digital value;

storing means for storing the digital value of the A/D converting means;

digital value converting means for converting plural digital values stored in the storing means into digital values for display, in accordance with conversion characteristics corresponding to a distribution state of the plural digital values; and displaying means for displaying an X-ray image on the basis of the digital values for display.

The X-ray imaging apparatus of the present invention uses digital values of all the pixels as the plural digital values.

The X-ray imaging apparatus of the present invention has conversion characteristics in which conversion is conducted so that maximum and minimum values of the plural digital values have respective predetermined values.

The X-ray imaging apparatus of the present invention has conversion characteristics in which conversion is conducted so that maximum and minimum values of the plural digital values respectively have maximum and minimum values of the digital values for display.

The X-ray imaging apparatus of the present invention has conversion characteristics in which conversion is conducted so that a predetermined number or rate of digital values which are higher and lower in level among the plural digital values are eliminated, and maximum and minimum values of the remaining digital values have respective predetermined values.

The X-ray imaging apparatus of the present invention comprises:

signal outputting means for receiving X-rays, and for outputting an analog image signal corresponding to an intensity of the X-rays;

signal amplifying means for amplifying the analog image signal;

A/D converting means for converting the amplified analog image signal into a digital value;

storing means for storing the digital value of the A/D converting means;

digital value converting means for converting plural digital values stored in the storing means into digital values for display, in accordance with conversion characteristics corresponding to a display purpose; and displaying means for displaying an X-ray image on the basis of the digital values for display.

Therefore, the X-ray imaging apparatus of the present invention is an apparatus in which the time and the distance for X-ray exposure can be set without difficulty and conditions can be easily set and which is therefore easy to operate.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Hereinafter, several embodiments of the present invention will be described with reference to the accompanying drawings.

<First Embodiment>

Figure 1:
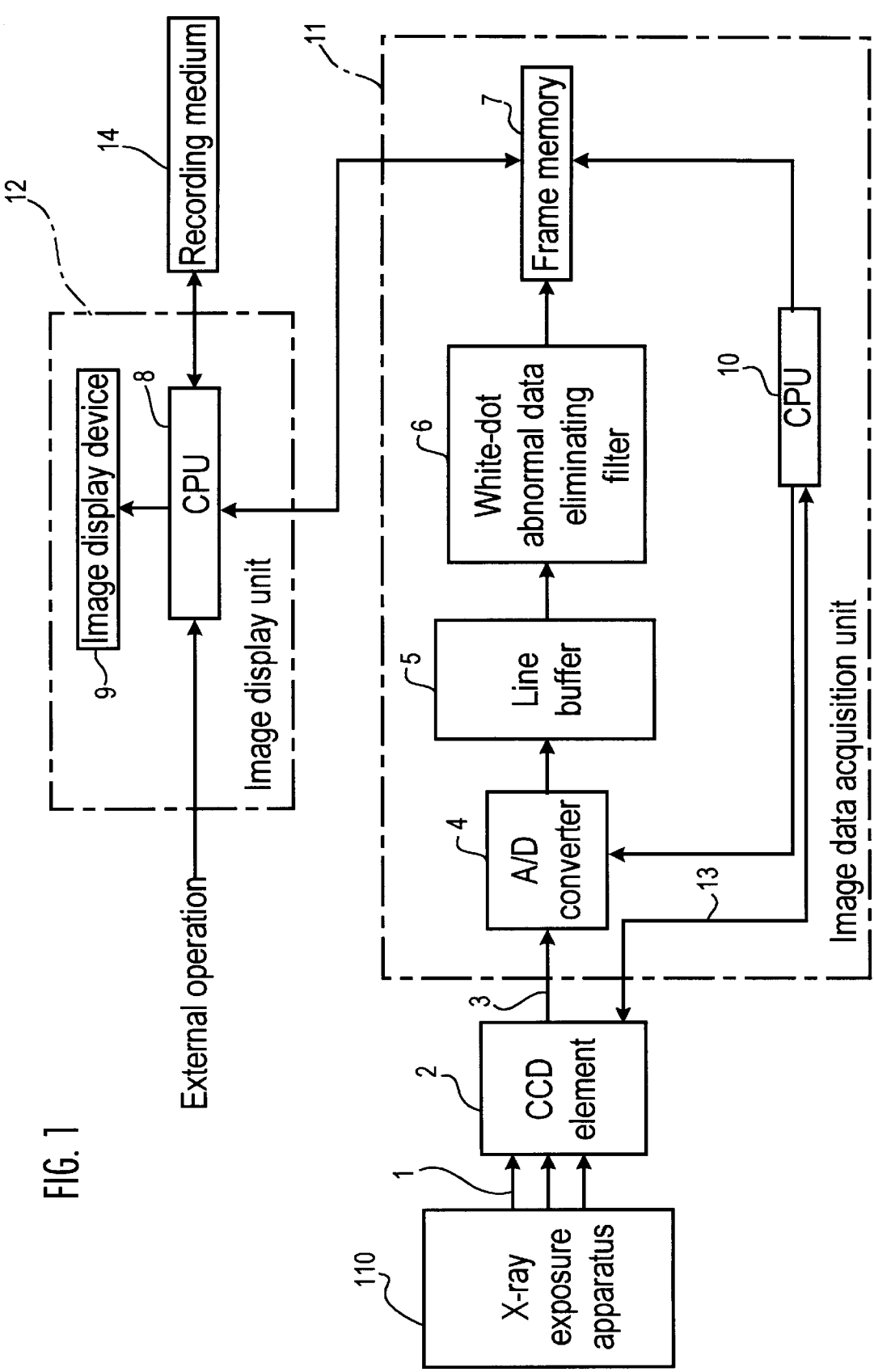
FIG. 1 is a block diagram showing the whole configuration of an X-ray imaging apparatus of a first embodiment of the present invention.

FIG. 1 is a block diagram showing the whole configuration of an X-ray imaging apparatus which is a first embodiment of the present invention. Referring to FIG. 1, X-rays 1 which have been irradiated from an X-ray exposure apparatus 110 and transmitted through the exposure object enter a CCD element 2 which serves as a CCD sensor. The CCD element 2 which serves as image data outputting means converts the X-rays 1 into an analog image signal 3 the level of which corresponds to the intensity of the X-rays, and outputs the signal to an A/D converter 4 of an image data acquisition unit 11. The analog image signal 3 supplied to the A/D converter 4 is converted into a digital image signal and then supplied to a line buffer 5. The line buffer 5 temporarily stores image data for two lines. The image data supplied to the line buffer 5 are then supplied to a frame memory 7 via a filter 6 which serves as abnormal data eliminating means for eliminating white-dot abnormal data. The frame memory 7 is a recording medium which stores all image data. The image data acquisition unit 11 has a CPU 10 which controls operations such as the CCD driving and the A/D conversion. The CCD element 2 is controlled by a CCD driving signal 13.

An image display unit 12 connected to the image data acquisition unit 11 has a CPU 8 which controls the image acquisition and the image display in accordance with external operations, and an image display device 9 which displays image data. The image data are recorded on a recording medium 14 on the basis of instructions from the CPU 8.

Figure 2:
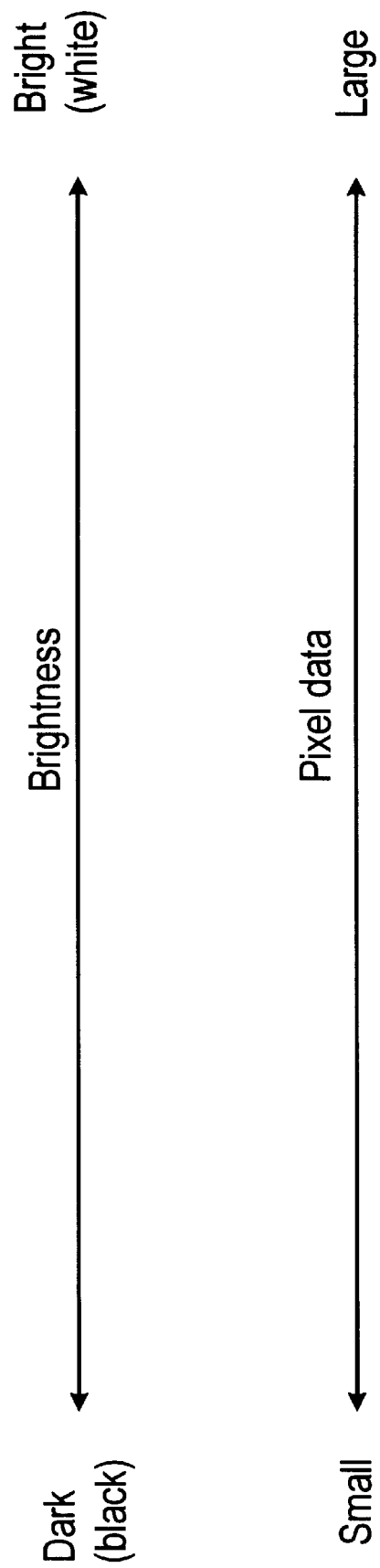
FIG. 2 is a view showing an example of relationships between the level of an image data and brightness in the X-ray imaging apparatus of the first embodiment.

The relationships between the brightness of an image and a pixel value which is a pixel data are set so that the pixel value is larger as the image is brighter. A pixel value indicates a substantial luminance at a pixel. FIG. 2 is a diagram illustrating relationships between the brightness of an image and the level of an image data.

In the X-ray imaging apparatus of the first embodiment, after a diseased part which is an exposure object is irradiated with the X-rays 1, the analog image signal 3 is output from the CCD element 2, and the image data for each pixel is converted into digital data for each line in the A/D converter 4.

Figure 3:
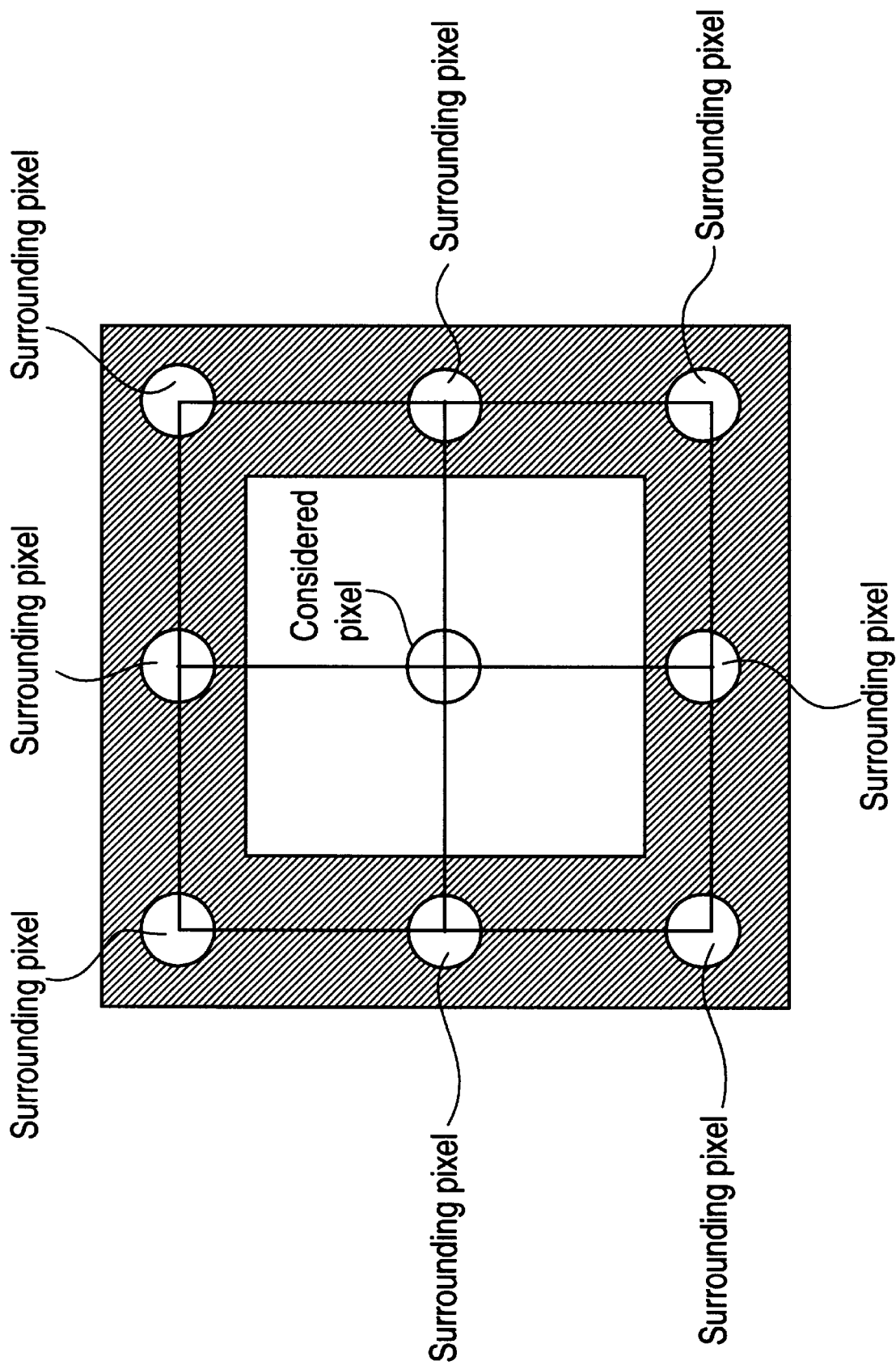
FIG. 3 is a view conceptually showing pixels of a part of a CCD sensor used in the description of a white-dot abnormal data eliminating filter in the X-ray imaging apparatus of the first embodiment.

With respect to the digital data supplied from the A/D converter 4, pixel data containing pixels for two lines at the maximum are stored in the line buffer 5. FIG. 3 is a view conceptually showing pixels of a part of the CCD element 2. As shown in FIG. 3, the line buffer 5 transmits the pixel data for each pixel (the considered pixel data) to the white-dot abnormal data eliminating filter 6, together with data of the eight pixels surrounding the pixel.

Figure 4:
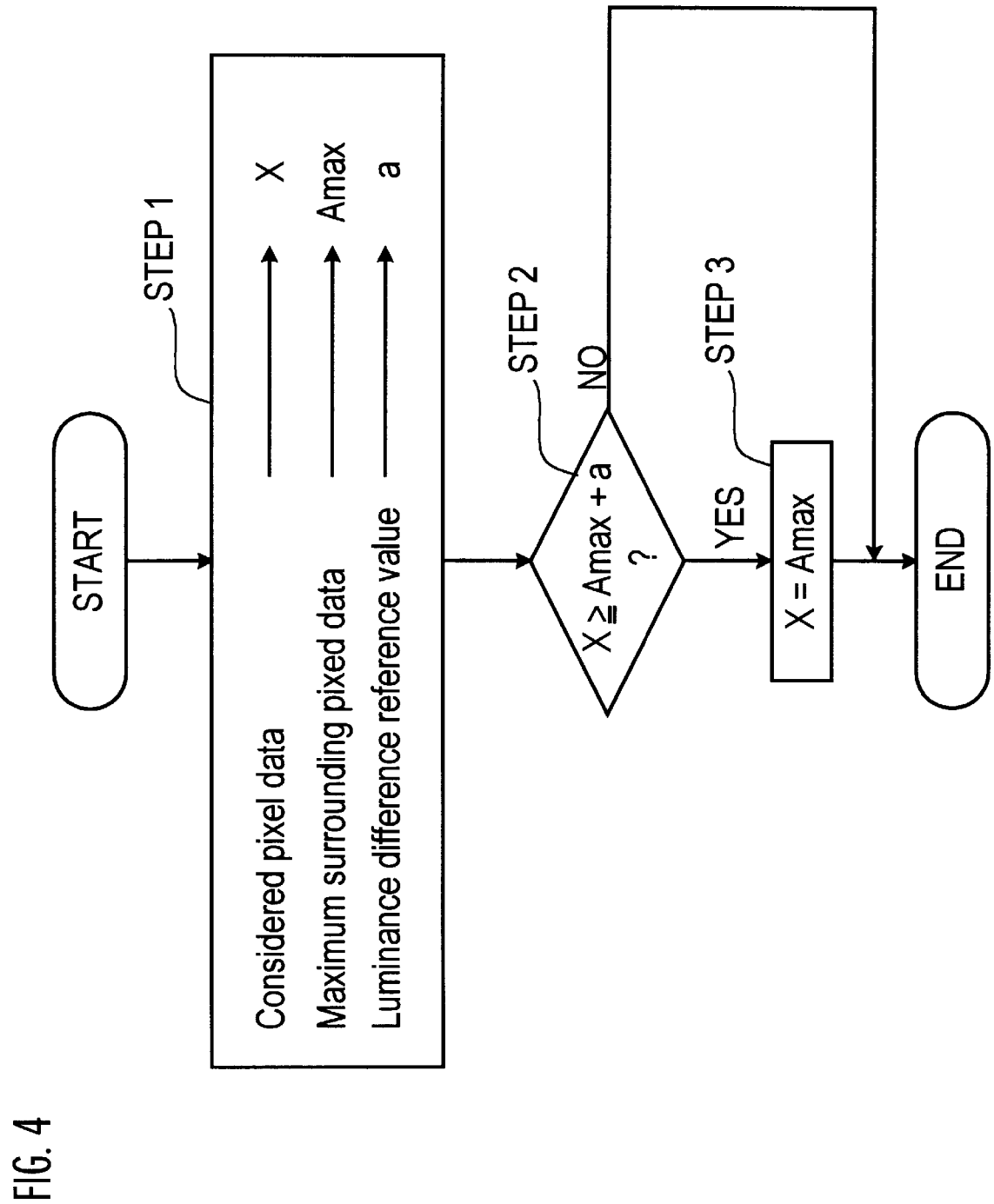
FIG. 4 shows a flow of a procedure conducted in the white-dot abnormal data eliminating filter in the X-ray imaging apparatus of the first embodiment.

FIG. 4 shows a flow of a procedure conducted in the white-dot abnormal data eliminating filter 6. The white-dot abnormal data eliminating filter 6 conducts the process of eliminating a white-dot abnormal data in accordance with the procedure shown in FIG. 4.

In STEP 1 of the flow shown in FIG. 4, the considered pixel shown in FIG. 3 is set to be X, the maximum value of the pixel data of the surrounding eight pixels (the maximum surrounding pixel data) is input as "Amax". Furthermore, a threshold a is set which is to be used for, when the considered pixel data exceeds the surrounding pixel data by the threshold or more, judging the pixel data to be abnormal.

If it is judged in STEP 2 of FIG. 4 that the considered pixel data X is not smaller than the maximum surrounding pixel data "Amax" and the difference between the considered pixel data X and the maximum surrounding pixel data "Amax" is equal to or larger than the threshold α, or, in other words, that the considered pixel data X is larger than the sum of the maximum surrounding pixel data "Amax" and the threshold α, the considered pixel data X is replaced in STEP 3 with the value of the maximum surrounding pixel data "Amax".

In this way, when the considered pixel data X largely exceeds the maximum surrounding pixel data "Amax", it is judged that the considered pixel data is a white-dot abnormal data, and the considered pixel data is replaced with the maximum value of the surrounding pixels, whereby a white-dot abnormal data is detected and corrected.

As described above, the white-dot abnormal data eliminating filter 6 conducts the process on each pixel, and the processed pixel data are sequentially stored into the frame memory 7.

In the first embodiment, the image data acquired by the CCD element 2 are passed through the white-dot abnormal data eliminating filter 6, thereby converting the image data into pixel data all of which are not a white-dot abnormal data, and the pixel data are stored into the frame memory 7 in the unit of one line. When the white-dot abnormal data eliminating filter 6 is designed so as to conduct a hardware process based on a gate array, therefore, it is possible to realize high-speed processing. Even when all the pixel data are passed through the white-dot abnormal data eliminating filter 6, the processing can be terminated without consuming a prolonged time, or, in other words, in a short time.

In the X-ray imaging apparatus of the first embodiment, the CPU 8 can control the image display device 9 so as to display the image data of the frame memory 7, and, as required, the corrected image data which are easy to observe can be stored onto the recording medium 14.

In the X-ray imaging apparatus of the first embodiment, as required, the brightness, the contrast, the magnification degree of the diseased part, or the like of the image on the image display device can be easily adjusted in response to an external operation on the CPU 8. As a result, the apparatus of the embodiment is an apparatus provided with a screen operation which facilitates diagnosis.

As described above, the X-ray imaging apparatus of the first embodiment has a white-dot abnormal data eliminating filter 6 which, when the value of a considered pixel data exceeds the maximum value of the eight surrounding pixel data by a predetermined threshold or more, corrects the considered pixel data so as to have a value within a predetermined range. Consequently, a pixel having an abnormal data which appears as a white dot in an X-ray image is detected from surrounding pixel data of the pixel, and the white-dot abnormal data is corrected so as to have an appropriate value. In the X-ray imaging apparatus of the first embodiment of the present invention, when a gate array or a high-speed CPU is used, it is possible to conduct the image data correction process in which waiting times are substantially eliminated.

In the X-ray imaging apparatus of the first embodiment, when the considered pixel data X exceeds a predetermined value, the considered pixel data X is replaced with the maximum surrounding pixel data "Amax". Alternatively, the considered pixel data X is replaced with an average value of the eight surrounding pixel data, in place of the maximum surrounding pixel data "Amax". Also the alternative can attain the same effects as the embodiment described above.

<Second Embodiment>

Figure 5:
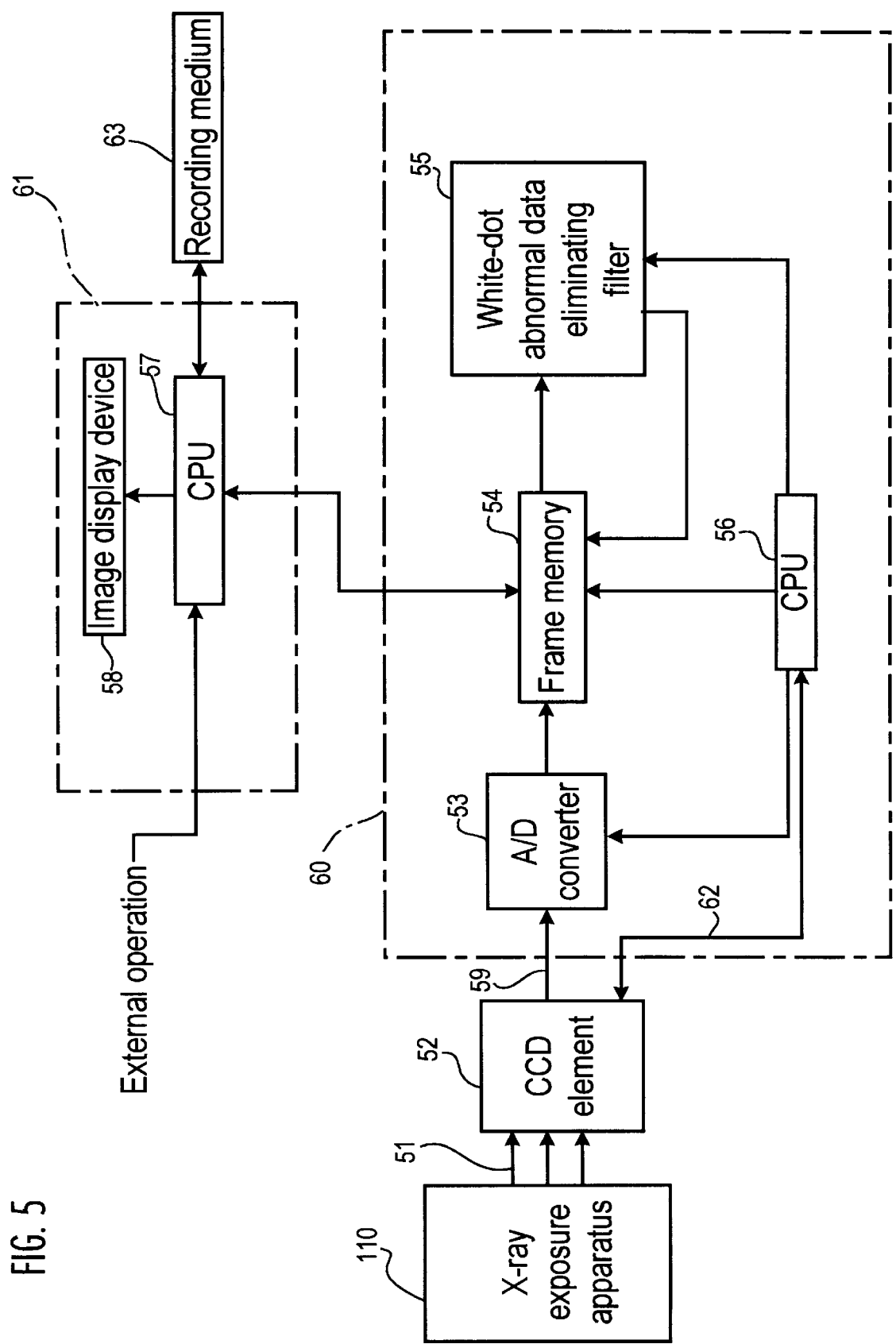
FIG. 5 is a block diagram showing the whole configuration of an X-ray imaging apparatus of a second embodiment of the present invention.

Hereinafter, a second embodiment of the X-ray imaging apparatus of the present invention will be described with reference to the accompanying drawings. FIG. 5 is a block diagram showing the whole configuration of an X-ray imaging apparatus of the second embodiment of the present invention. Referring to FIG. 5, X-rays 51 which have been irradiated from an X-ray exposure apparatus 110 and transmitted through a diseased part that is the exposure object enter a CCD element 52. The CCD element 52 which serves as image data outputting means converts the X-rays 51 into an analog image signal 59, and outputs the signal to an A/D converter 53 of an image data acquisition unit 60. The analog image signal 59 supplied to the A/D converter 53 is converted into a digital image signal and then supplied to a frame memory 54 to be recorded thereinto. The image data supplied to the frame memory 54 are then corrected and rewritten by a white-dot abnormal data eliminating filter 55 which eliminates white-dot abnormal data.

The image data acquisition unit 60 has a CPU 56 which controls operations such as the CCD driving, the A/D conversion, and the data correction. The CCD element 52 is controlled by a CCD driving signal 62.

An image display unit 61 connected to the image data acquisition unit 60 has a CPU 57 which controls the image acquisition and the image display in accordance with external operations, and an image display device 58 which displays image data. The image data are recorded on a recording medium 63 on the basis of instructions from the CPU 57.

Figure 6:
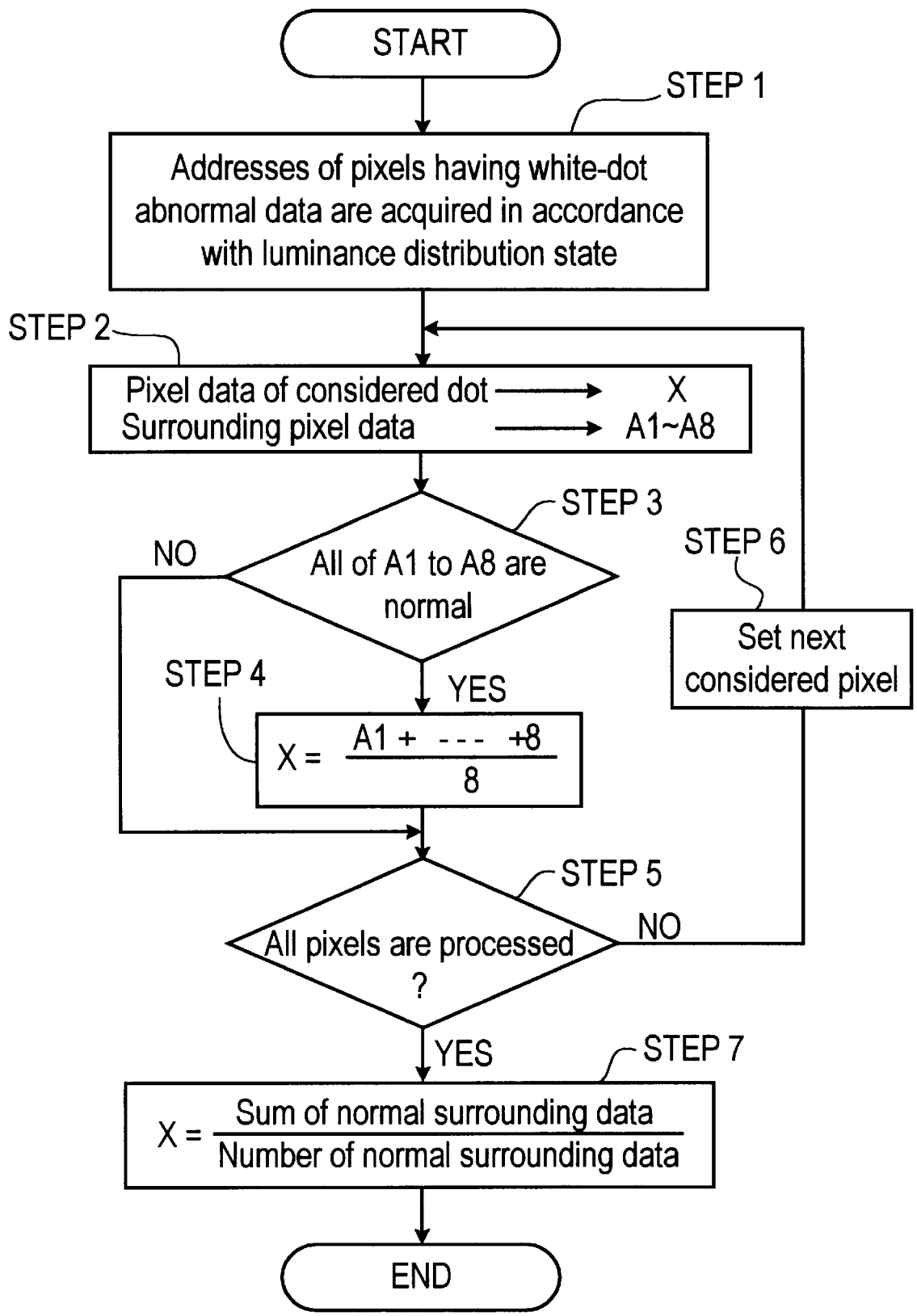
FIG. 6 shows a flow of a procedure conducted in a white-dot abnormal data eliminating filter in the X-ray imaging apparatus of the second embodiment.

In the X-ray imaging apparatus of the second embodiment, after a diseased part which is an exposure object is irradiated with the X-rays 51, the analog image signal 59 output from the CCD element 52 is converted for each pixel into digital data in the A/D converter 53, and then sequentially stored into the frame memory 54. When all the pixel data are stored, the white-dot abnormal data eliminating filter 55 corrects white-dot abnormal data. FIG. 6 shows a flow of the procedure of correcting white-dot abnormal data conducted in the white-dot abnormal data eliminating filter 55.

In STEP 1 of FIG. 6, the luminance distribution state of all the pixel data of the frame memory 54 is obtained, and the addresses of all pixels having white-dot abnormal data are acquired from the luminance distribution state.

Figure 7:
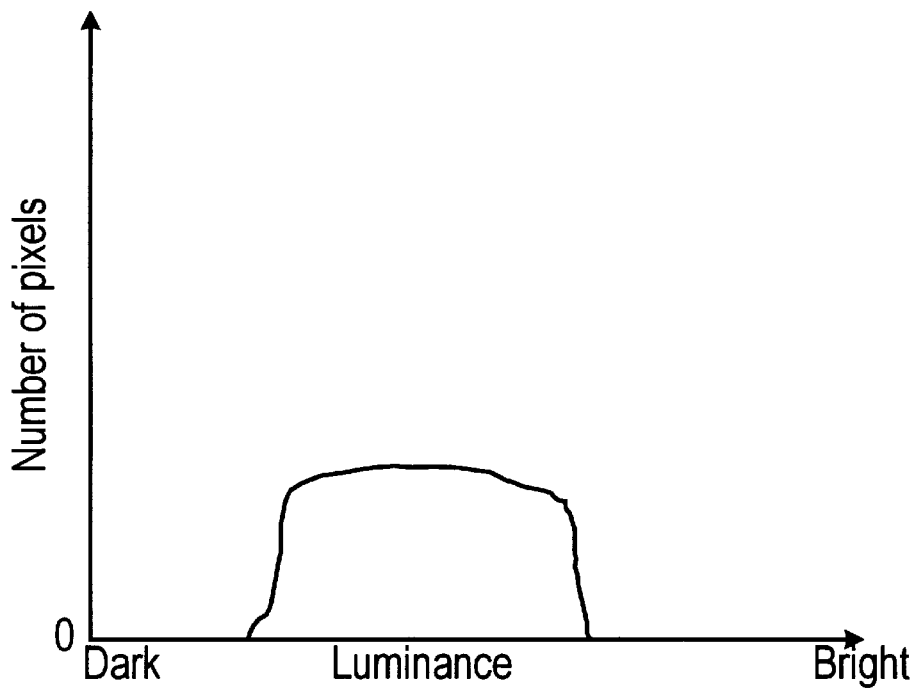
FIG. 7 is a graph showing a luminance distribution in the case where there is no white-dot abnormal data in the X-ray imaging apparatus of the second embodiment.

The method of acquiring the addresses of pixels having white-dot abnormal data will be described with reference to FIGS. 7 to 9. FIG. 7 is a graph showing the luminance distribution in the case where there is no white-dot abnormal data in all the pixel data, FIG. 8 is a graph showing the luminance distribution in the case where there are white-dot abnormal data, and FIG. 9 shows a flow of the procedure of acquiring the addresses of pixels having white-dot abnormal data.

Figure 8:
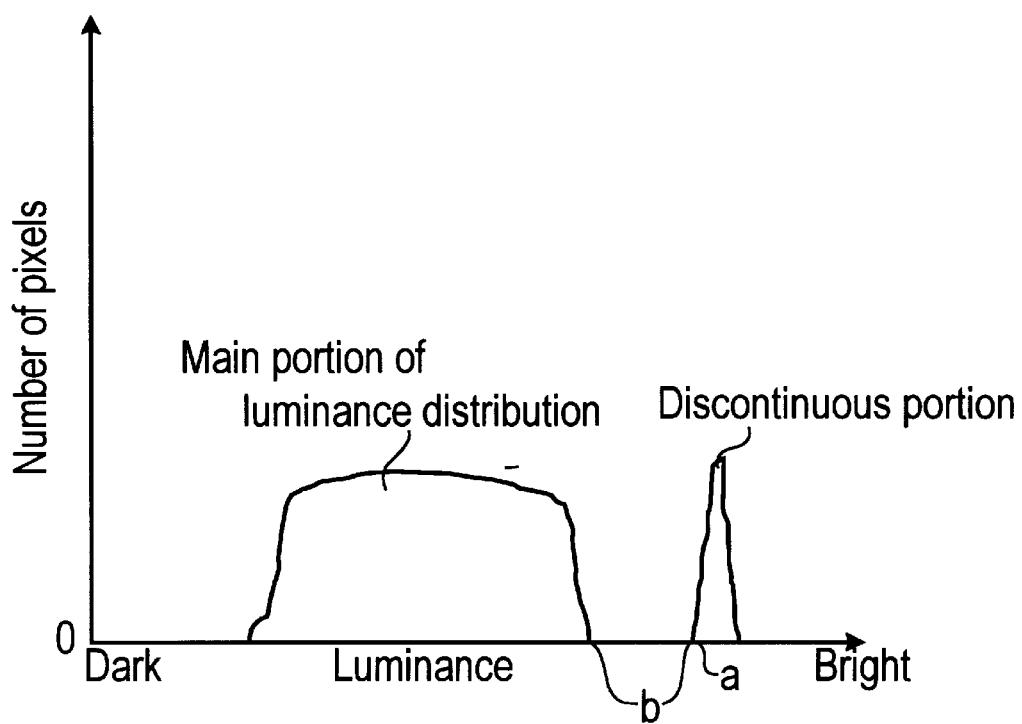
FIG. 8 is a graph showing a luminance distribution in the case where there are white-dot abnormal data in the X-ray imaging apparatus of the second embodiment.

The luminance distributions shown in FIGS. 7 and 8 indicate the manner of pixel distribution in all the pixel data with respect to the whole range of luminance. When there is no white-dot abnormal data in all the pixel data, a distribution curve which is continuous as a whole is obtained as shown in FIG. 7. When there is a white-dot abnormal data in the pixel data, however, a distribution curve (discontinuous portion) exists at a position slightly separated from the main portion (main portion of the luminance distribution curve) which is continuous as shown in FIG. 8. In FIG. 8, the symbol a indicates a pixel value indicating the luminance at which the discontinuous portion starts, and the symbol b indicates the luminance range between the main portion of the luminance distribution and the discontinuous portion.

Figure 9:
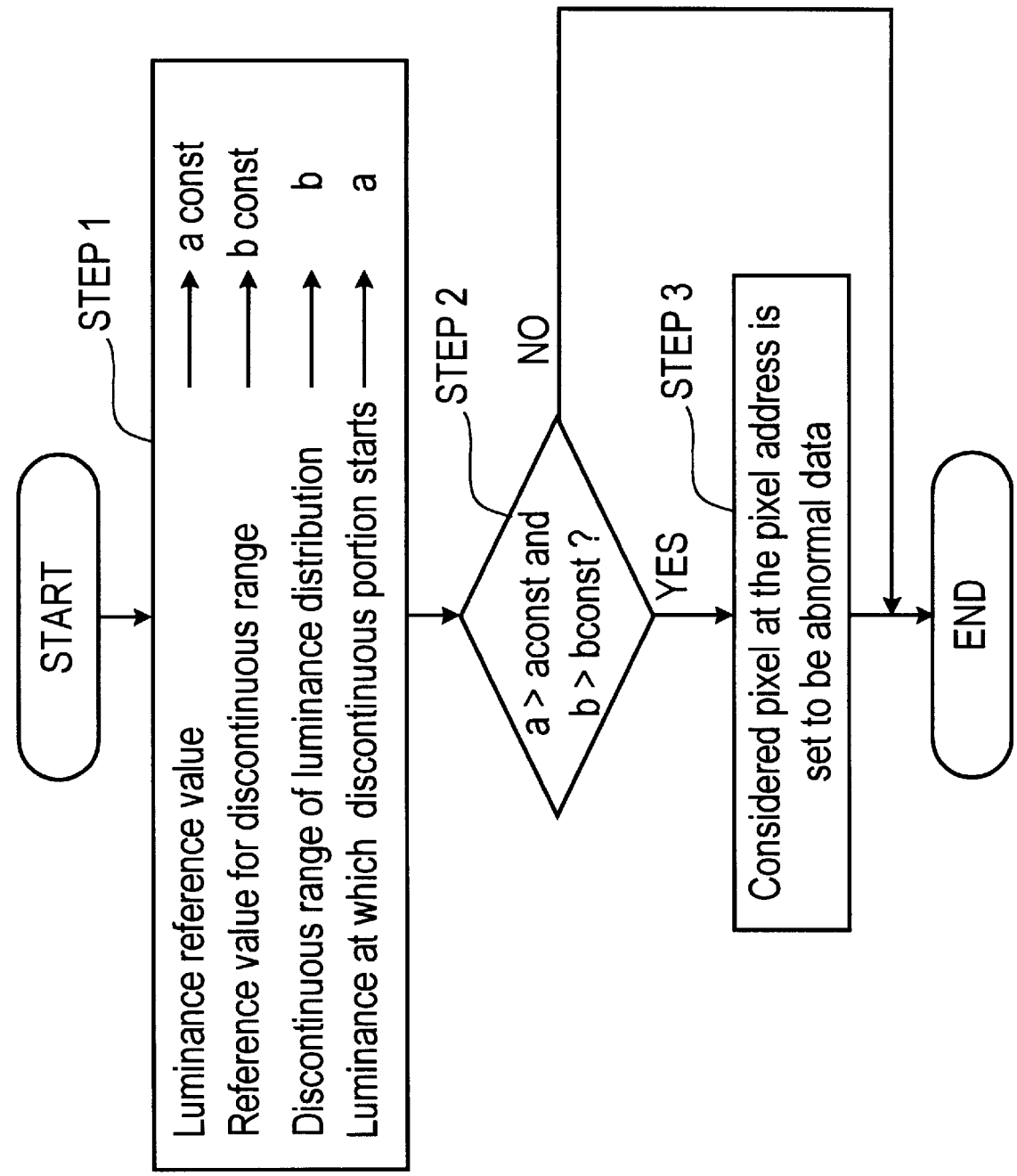
FIG. 9 shows a flow of a procedure conducted in the white-dot abnormal data eliminating filter in the X-ray imaging apparatus of the second embodiment.

FIG. 9 shows a flow of the procedure of acquiring the addresses of pixels having white-dot abnormal data conducted in the white-dot abnormal data eliminating filter 55.

In STEP 1 of the flow shown in FIG. 9, the luminance reference value is set to be "aconst", and the reference value for the discontinuous range is set to be "bconst". It is assumed that, in an actual luminance distribution, the luminance range of the discontinuous portion is b and the pixel value indicating the luminance at which the discontinuous portion starts is a. The luminance range b of the luminance range, and the pixel value a at which the discontinuous portion starts are defined in the same manner as those in the luminance distribution shown in FIG. 8.

In STEP 2 shown in FIG. 9, when the pixel value a is larger than the predetermined luminance reference value "aconst" and the luminance range b of the discontinuous portion is larger than the predetermined reference value "bconst" for the discontinuous range, pixel addresses are acquired while assuming that the addresses of all the pixels of the discontinuous portion having luminance higher than that of the main portion of the luminance distribution curve are white-dot abnormal data.

After pixel addresses are acquired as white-dot abnormal data as described above, the process returns to the flow of FIG. 6. In STEP 2 of FIG. 6, the pixel data of the white-dot abnormal data (considered dot) is set to be X and the eight surrounding pixel data in the neighborhood of the pixel are set to be A1 to A8.

If all the surrounding pixel data A1 to A8 are normal data in STEP 3, the value of X is replaced in STEP 4 with the average value of A1 to A8, and the value is then stored into the frame memory 54. In this way, the average value replacing process in the case where all the surrounding pixel data A1 to A8 are normal data is conducted on all the white-dot abnormal data. The average value replacing process in STEPs 3 and 4 is repeated until all the pixels are processed.

Next, with respect to the remaining white-dot abnormal data, the averaging process is conducted in STEP 5 by using only normal data among the eight surrounding data. The average value is stored into the frame memory 54 as the new normal pixel data X of the considered pixel.

The above-mentioned process of correcting white-dot abnormal data requires a prolonged time. However, the process is a correction system which is effective in the case where adjacent pixels continuously contain abnormality.

In this way, white-dot abnormal data in all the pixel data are corrected, and the image data which include no white-dot abnormal data are stored into the frame memory 54. The CPU 57 of the image display unit 61 controls the image display device 58 so as to display the image data of the frame memory 54, and, as required, the corrected image data which are easy to observe are stored onto the recording medium 63.

In the X-ray imaging apparatus of the second embodiment, as required, the brightness, the contrast, the magnification degree of the diseased part, or the like of the image data can be easily adjusted in response to an external operation. As a result, the apparatus of the embodiment is an apparatus provided with a screen operation which facilitates diagnosis.

In the X-ray imaging apparatus of the second embodiment, the white-dot abnormal data eliminating filter 55 is disposed so as to check the luminance distribution of all the pixel data which have been acquired. When the luminance distribution is not continuous and there exists a luminance distribution separated by a predetermined value or more, the pixel data having the discontinuous luminance distribution is changed to the average value of the surrounding data, and the pixel data in the frame memory is rewritten. Therefore, the X-ray imaging apparatus of the second embodiment can detect a pixel having abnormal data which appears as a white dot, from all the pixel data, and correct the white-dot abnormal data so as to have an appropriate value.

In the X-ray imaging apparatus of the second embodiment, when a gate array or a high-speed CPU is used, it is possible to conduct the image data correction process in which waiting times are substantially eliminated.

The second embodiment of the present invention may be realized by a program. When the program is recorded on a recording medium such as a floppy disk and then transported, the embodiment can be easily executed also in another independent computer system.

Figure 10A:
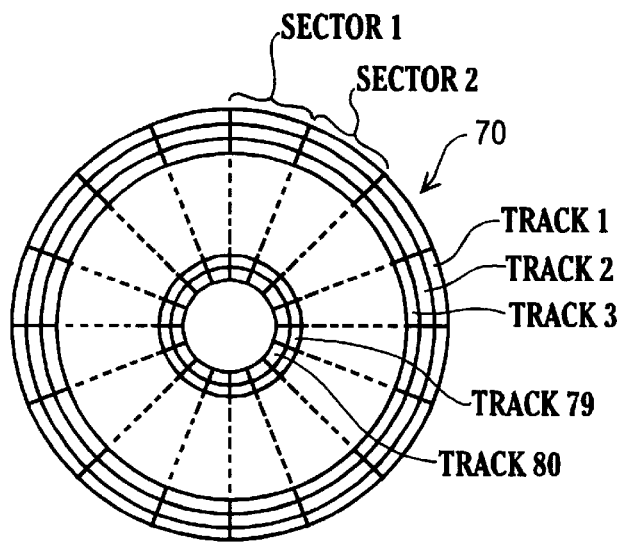
FIG. 10 is a view showing a floppy disk, a floppy disk drive, and the like of the X-ray imaging apparatus of the second embodiment, (a) is a view showing an example of a physical format of the floppy disk which is the body of a recording medium, (b) is a view showing a floppy disk case which houses the floppy disk, and (c) is a view showing a floppy disk drive, and the like which record and reproduce a program on and from the floppy disk.
Figure 10B:
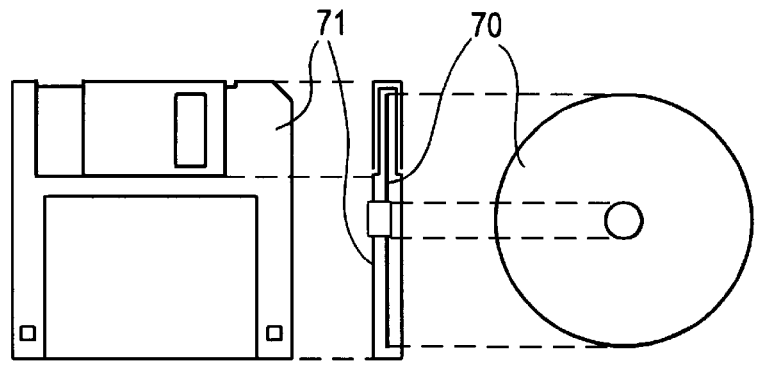
Figure 10C:
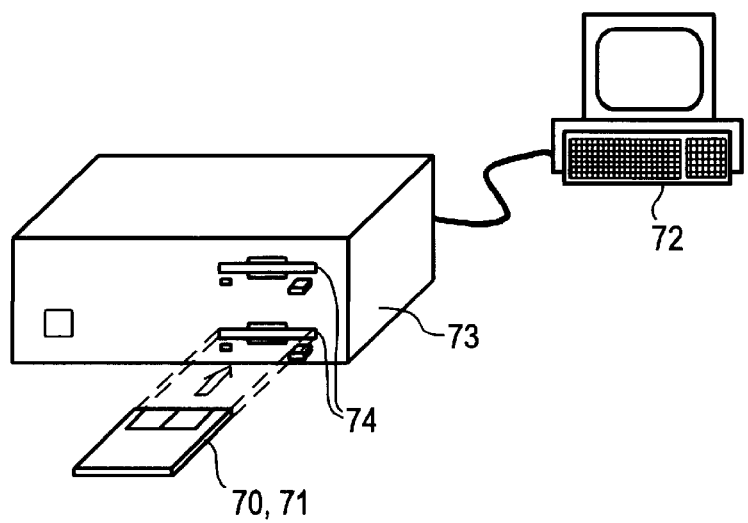

Next, the case where the correction process of the X-ray imaging apparatus of the second embodiment is executed by means of a floppy disk will be described. FIG. 10 is a view illustrating the case where the correction process of the X-ray imaging apparatus is executed by means of a floppy disk.

In FIG. 10, (a) is a view showing an example of the physical format of the floppy disk 70 which is the body of the recording medium. As shown in (a) of FIG. 10, tracks are concentrically formed on the floppy disk 70 so as to be arranged from the outer circumference to the inner circumference, and the disk is divided into 16 sectors. The program is recorded in accordance with the storage area which is divided as described above.

In FIG. 10, (b) is a view showing a case which houses the floppy disk 70. In (b) of FIG. 10, a front view of the floppy disk case 71, a section view of the case, a front view of the floppy disk 70 are arranged in this sequence with starting from the left side. When the floppy disk 70 is housed in the floppy disk case 71 in this way, the floppy disk 70 can be protected from dust and an external shock, and safely transported.

In FIG. 10, (c) is a view showing a computer system, and the like which record and reproduce the program on and from the floppy disk 70 shown in (b) of FIG. 10.

As shown in (c) of FIG. 10, when a floppy disk drive 73 is connected to the computer system 72, the program can be recorded and reproduced on and from the floppy disk 70. The floppy disk 70 is loaded and unloaded through an insertion slot 74 of the floppy disk drive 73, and the program is recorded and reproduced on and from the floppy disk 70.

When the program for the correction process of the X-ray imaging apparatus is to be loaded, the floppy disk drive 73 reads out the program from the floppy disk 70 and the read out program is transferred to the computer system 72.

In the above, the X-ray imaging apparatus of the second embodiment in which the floppy disk 70 is used as a recording medium has been described. Also when an optical disk is used, the present invention can be executed in the same manner. The recording medium of the present invention is not restricted to these media. Also when the present invention is applied to a recording medium of another kind which can record a program, such as an IC card and a ROM cassette, the present invention can be executed in the same manner as the embodiment described above.

The second embodiment is configured so as to acquire the luminance distribution of all pixel data. Also the configuration in which the luminance distribution of pixel data in a specific range is acquired can attain the same effects as the embodiment described above. In the second embodiment, the considered pixel data X is replaced with the average value of normal data among the surrounding pixel data. Alternatively, the considered pixel data may be replaced with the maximum or minimum value of the normal data.

<Third Embodiment>

Figure 11:
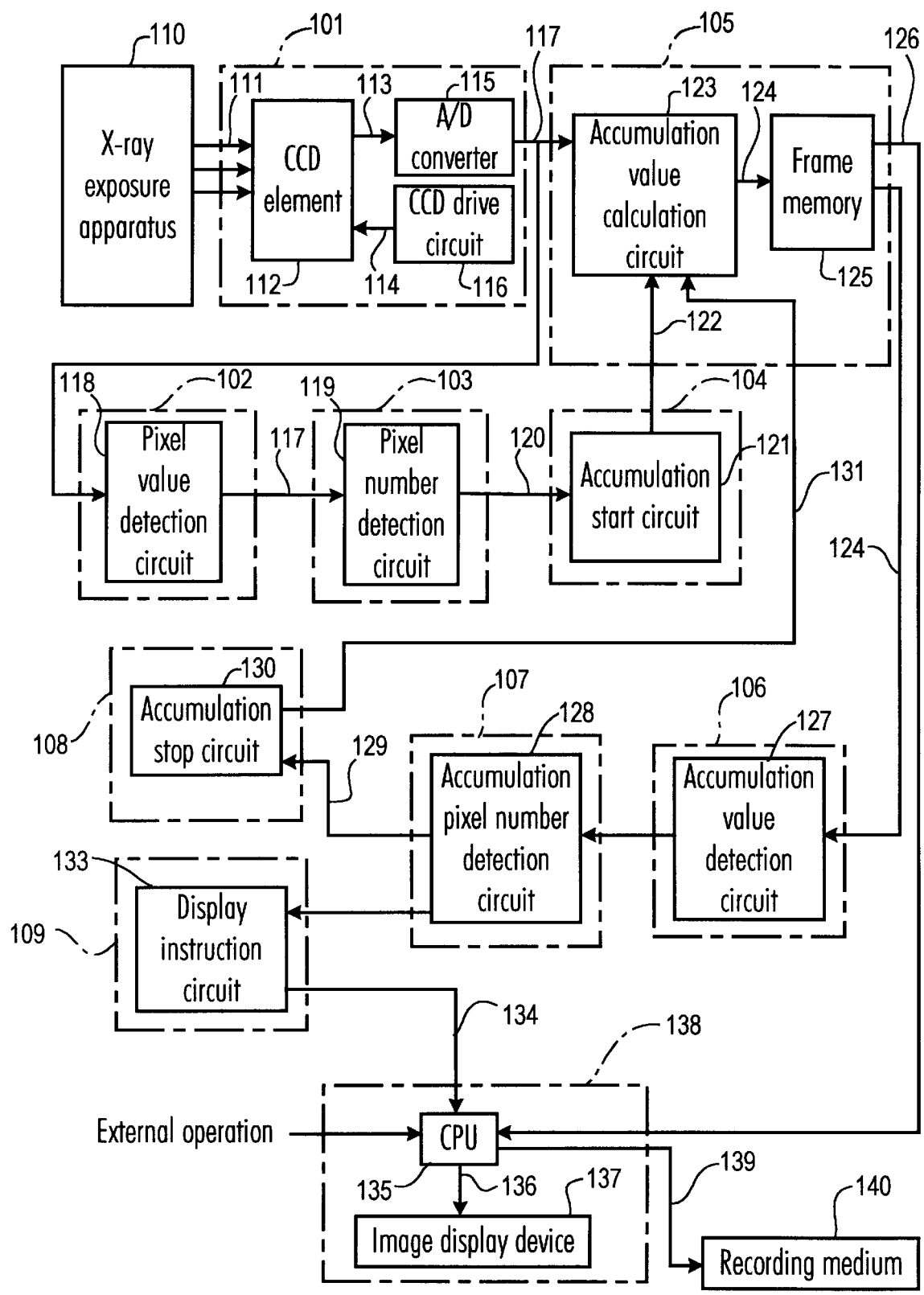
FIG. 11 is a block diagram showing the whole configuration of an X-ray imaging apparatus of a third embodiment of the present invention.
Figure 12:
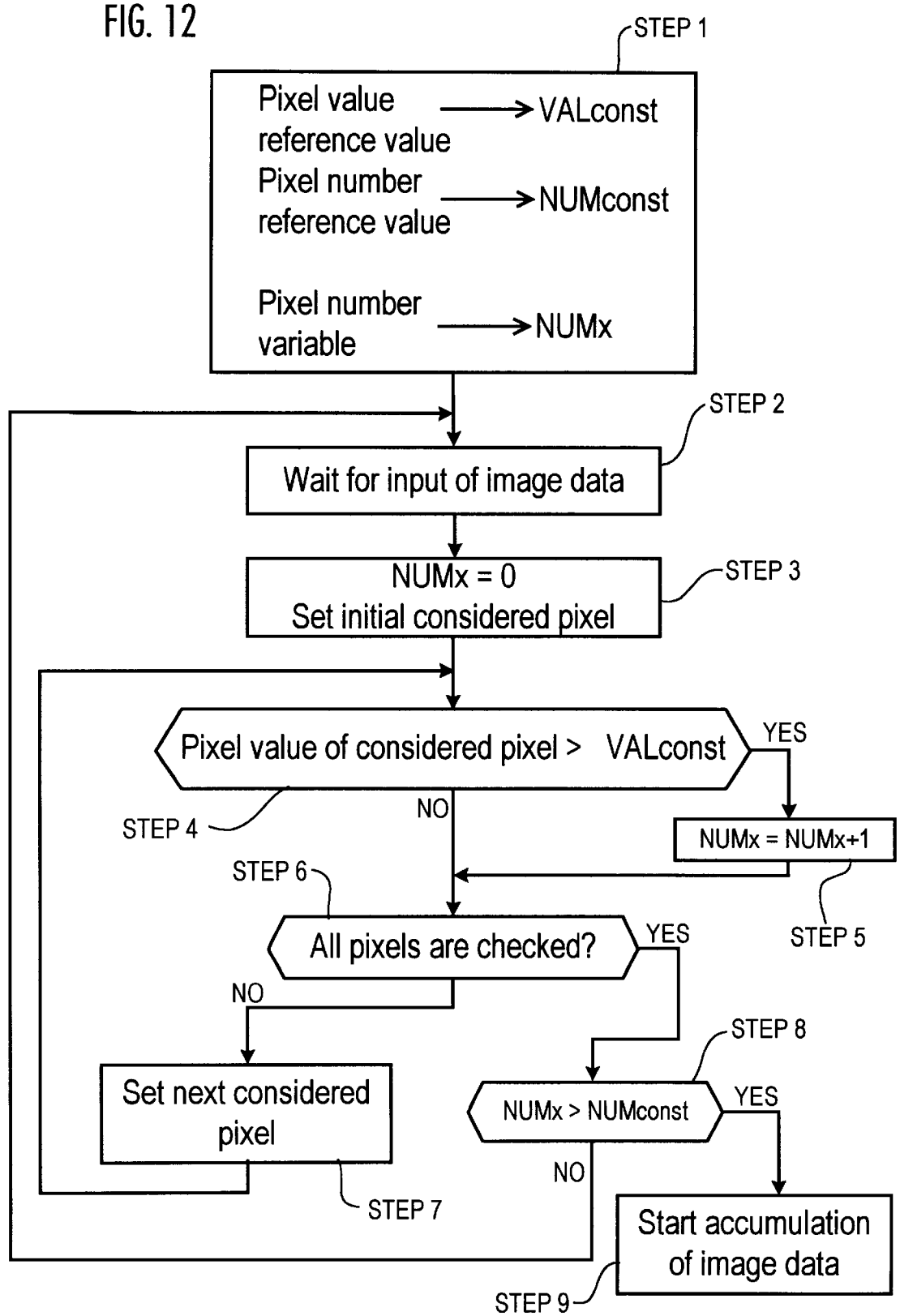
FIG. 12 shows a flow of a procedure conducted from the start of exposure to the start of accumulation in the X-ray imaging apparatus of the third embodiment.
Figure 13:
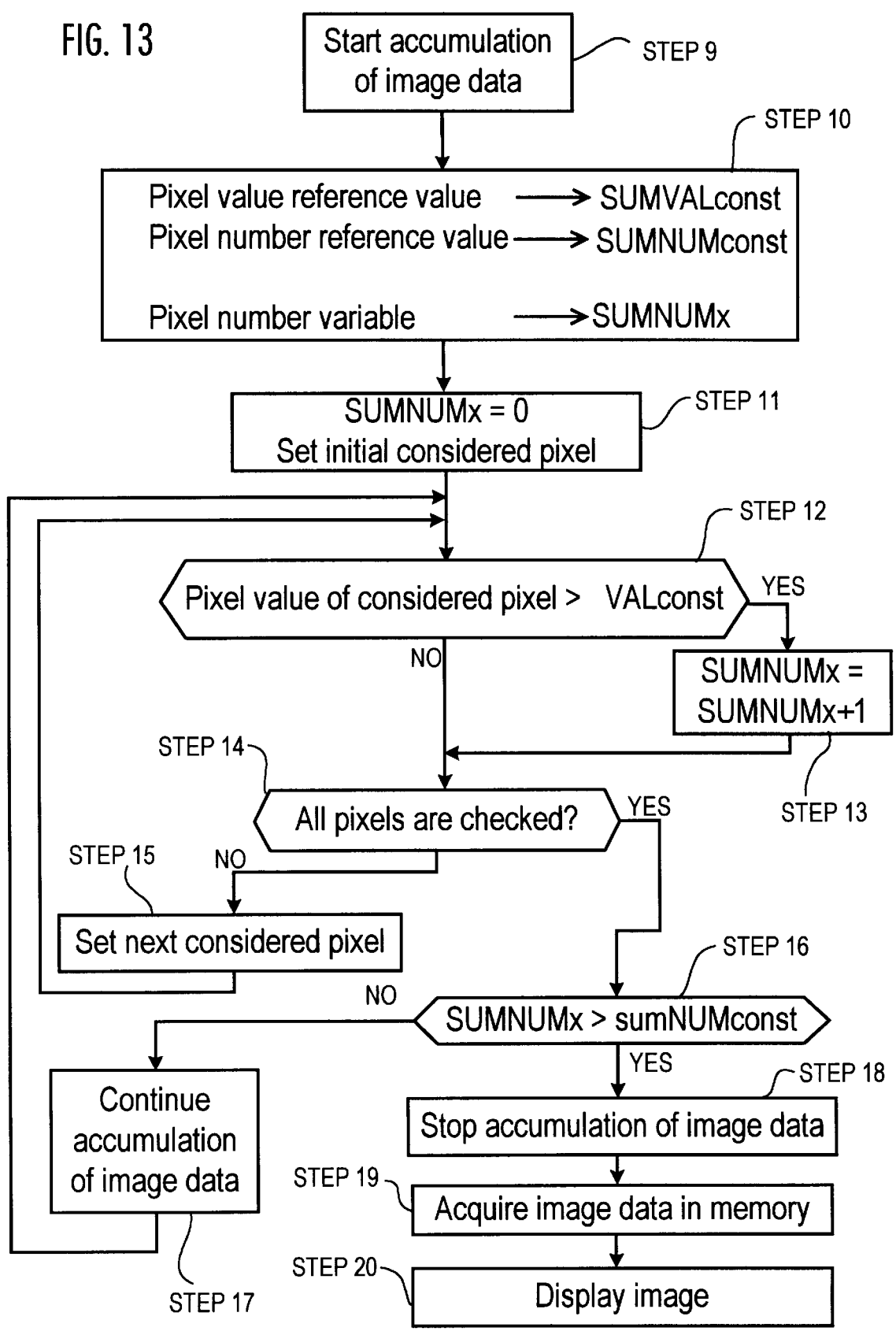
FIG. 13 shows a flow of a procedure conducted from the start of accumulation to the display of an image in the X-ray imaging apparatus of the third embodiment.

Hereinafter, a third embodiment of the X-ray imaging apparatus of the present invention will be described with reference to the accompanying drawings. FIG. 11 is a block diagram showing the whole configuration of the X-ray imaging apparatus of the third embodiment. FIG. 12 shows a flow of a procedure conducted from the start of exposure to the start of accumulation in the third embodiment, and FIG. 13 shows a flow of a procedure conducted from the start of accumulation to the display of an image in the third embodiment.

Referring to FIG. 11, X-rays 111 which have been irradiated from an X-ray exposure apparatus 110 and transmitted through a diseased part that is the exposure object enter a CCD element 112 of an X-ray detection unit 101. The X-ray detection unit 101 which serves as X-ray detecting means comprises the CCD element 112, an A/D converter 115, and a CCD driver 116, and outputs a digital image signal 117. An accumulation unit 105 which serves as accumulating means for receiving the digital image signal 117 comprises an accumulation value calculation circuit 123 and a frame memory 125.

The CCD element 112 which serves as image data outputting means converts the X-rays 111 into an analog image signal 113, and outputs the signal to the A/D converter 115. The A/D converter 115 supplies the digital image signal 117 to the accumulation value calculation circuit 123 of the accumulation unit 105 which serves as accumulating means, and also to a pixel value detection circuit 118 of a pixel value detection unit 102 which serves as accumulation value detecting means. The output of the pixel value detection circuit 118 is supplied to a pixel number detection circuit 119 of a pixel number detection unit 103 which serves as pixel number detecting means, and then to the accumulation value calculation circuit 123 via an accumulation start circuit 121 of an accumulation start unit 104.

The accumulation unit 105 comprises the accumulation value calculation circuit 123 and a frame memory 125. The output of the frame memory 125 is supplied to an accumulation value detection circuit 127 of an accumulation value detection unit 106, and then to an accumulation stop circuit 130 of an accumulation stop unit 108 via an accumulated pixel number detection circuit 128 of an accumulated pixel number detection unit 107. The output of the accumulated pixel number detection circuit 128 is supplied to a display instruction circuit 133 of a display instruction unit 109. The output of the display instruction circuit 133 is supplied to a CPU 135 of an image display unit 138.

The image display unit 138 connected to the display instruction unit 109 has the CPU 135 which controls the image acquisition and the image display in accordance with external operations, and an image display device 137 which displays image data. The image data are recorded on a recording medium 140 on the basis of instructions from the CPU 135.

In FIG. 11, the arrows indicate the X-rays 111 and the flows of the signals, the numeral 114 indicates a CCD driving signal, the numeral 120 indicates an accumulation start flag, the numeral 122 indicates an accumulation start instruction signal, the numeral 124 indicates an accumulated digital image signal, the numeral 126 indicates digital image data for display, the numeral 129 indicates an accumulation stop flag, the numeral 131 indicates an accumulation stop instruction signal, the numeral 132 indicates a display instruction flag, the numeral 134 indicates a display instruction signal, the numeral 136 indicates an image display signal, and the numeral 139 indicates digital image data for storage.

In the CCD element 112 of the X-ray imaging apparatus of the third embodiment, a fluorescent member (a scintillator made of, for example, $Gd_2O_2S$) which converts X-rays into visible light is disposed on the surface of the CCD. In the X-ray imaging apparatus of the present invention, in place of the fluorescent member, a cadmium telluride detecting element (CdTe detecting element) connected to the pixels may be disposed on the surface of the CCD. As the cadmium telluride detecting element (CdTe detecting element), the element disclosed in, for example, Japanese Patent National Publication No. (TOKU-HYO-HEI) 6-505800 may be used.

Next, the operation of the X-ray imaging apparatus of the third embodiment will be described.

First, a diseased part or the like which is an exposure object is irradiated with the X-rays 111 emitted from the X-ray exposure apparatus 110, and the CCD element 112 then supplies the analog image signal 113 corresponding to the image, to the A/D converter 115. The A/D converter 115 to which the analog image signal 113 is input supplies the digital image signal 117 to the pixel value detection unit 102, and also to the accumulation unit 105.

FIG. 12 shows a flow of a procedure conducted from the start of exposure to the start of accumulation in the X-ray imaging apparatus of the third embodiment.

In the X-ray imaging apparatus of the third embodiment, as shown in STEP 1 of FIG. 12, the pixel value detection circuit 118 of the pixel value detection unit 102 sets a pixel value reference value to be a predetermined value "VALconst" as the initial setting. The pixel value reference value is used as the reference of brightness for judging that the X-ray exposure is conducted. In STEP 1, a pixel number reference value is set to be a predetermined value "NUMconst." The pixel number reference value is used as the reference of the pixel number in the CCD sensor and for judging that the X-ray exposure is conducted. A pixel number variable showing the current count number of the pixel number is indicated by "NUMx."

In STEP 2, the process enters the state of waiting for an input of image data. In STEP 3, in order to acquire the initial pixel of the digital image signal 117, the pixel number variable "NUMX" is cleared to 0.

Next, it is judged in STEP 4 whether the pixel value of the currently considered pixel is larger than the pixel value reference value "VALconst" or not. If the pixel value of the considered pixel is larger than the pixel value reference value "VALconst," the pixel number variable "NUMx" is incremented in STEP 5 by one, and the process then proceeds to STEP 6.

By contrast, if the pixel value of the considered pixel is not larger than the pixel value reference value "VALconst," the process then proceeds to STEP 6 while maintaining the pixel number variable "NUMx" as it is.

In STEP 6, it is judged whether the pixel values of all the pixels have been checked or not. If the operation of checking the pixel values is not ended, the next considered pixel of the digital image signal 117 is acquired in STEP 7, and the loop directed to STEP 4 is then repeated.

By contrast, if it is judged in STEP 6 that the pixel values of all the pixels have been checked, the process proceeds to STEP 8 so as to be transferred to the pixel number detection circuit 119 of the pixel number detection unit 103 shown in FIG. 11.

The pixel number detection circuit 119 of the pixel number detection unit 103 judges in STEP 8 of FIG. 12 whether the pixel number variable "NUMx" is larger than the pixel number reference value "NUMconst" or not.

If it is judged in STEP 8 that the pixel number variable "NUMx" is larger than the pixel number reference value "NUMconst," accumulation of image data is started in STEP 9. At this time, the pixel number detection circuit 119 sends the accumulation start flag 120 to the accumulation start circuit 121 of FIG. 11.

By contrast, if it is judged in STEP 8 that the pixel number variable "NUMx" is not larger than the pixel number reference value "NUMconst," the process returns to STEP 2 and this loop is repeated.

Upon receiving the accumulation start flag 120, the accumulation start circuit 121 of the accumulation start unit 104 supplies the accumulation start instruction signal 122 to the accumulation value calculation circuit 123. When the accumulation value calculation circuit 123 receives the accumulation start instruction signal 122, the circuit converts the digital image signal 117 which is thereafter periodically transmitted, into the accumulated digital image signal 124, and stores the accumulated digital image signal into the frame memory 125.

Figure 25:
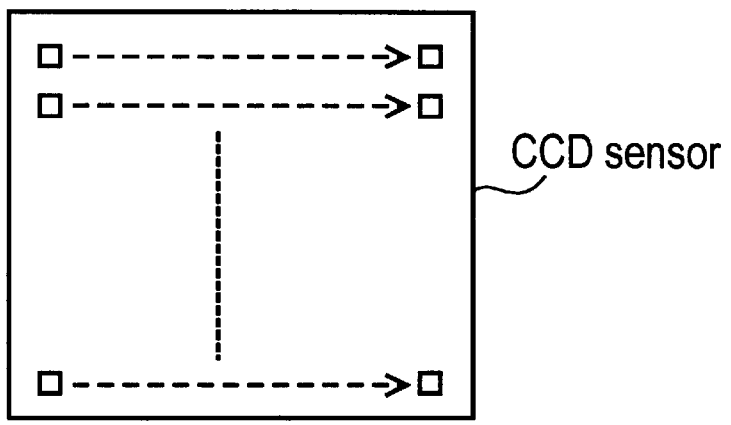
FIG. 25 is the view conceptually showing the configuration of pixels in a CCD sensor.
Figure 26:
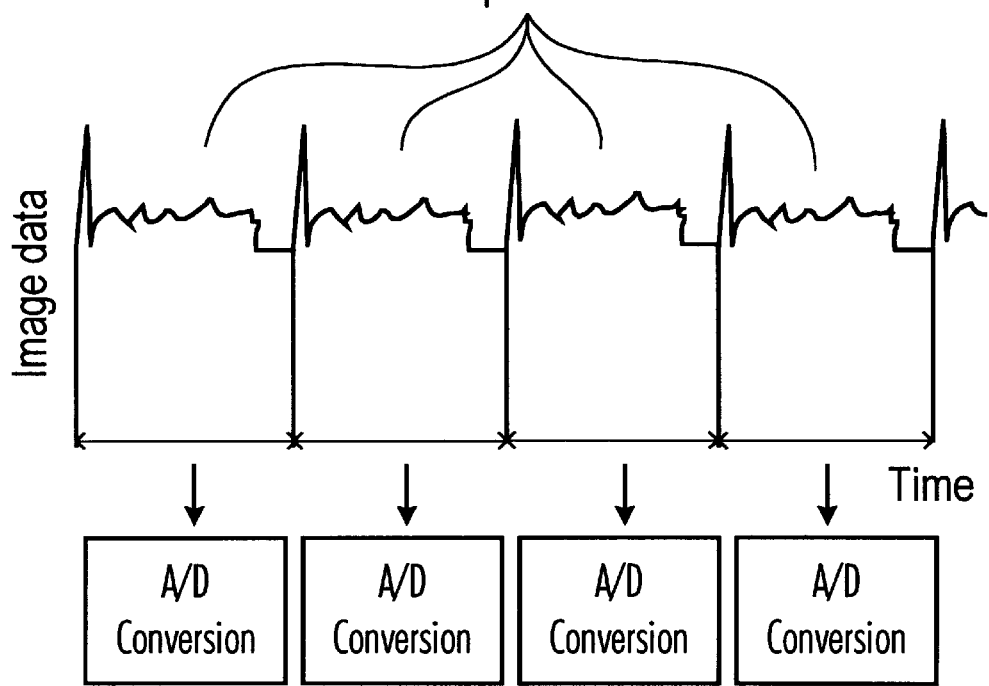
FIG. 26 is the view conceptually showing an output of an analog image signal of the CCD sensor and an A/D conversion method.

Referring to FIGS. 25 and 26 described above, the output of the analog image signal from the CCD sensor having the CCD element in the third embodiment, and the method of the A/D conversion will be briefly described.

As shown in FIG. 25, the CCD sensor has pixels arranged in a predetermined number in both the vertical and lateral directions. As shown in FIG. 26, the CCD sensor always outputs at a constant period the analog image signal 113 containing image data of all the pixels of the CCD sensor. The image data of all the pixels are A/D converted at each period, thereby obtaining the digital image signal 117. The digital image signal 117 is accumulated and then stored into the frame memory 125, with the result that image data having an appropriate image quality are obtained.

When accumulation of the digital image signal 117 is started in this way, the accumulation value detection circuit 127 of the accumulation value detection unit 106 acquires the accumulated digital image signal 124 stored in the frame memory 125 and starts the process of accumulating image data.

FIG. 13 shows a flow of a procedure conducted from the start of accumulation to the display of an image in the X-ray imaging apparatus of the third embodiment.

As shown in FIG. 13, an accumulation value reference value is set in STEP 10 to be a predetermined value "SUMVALconst" as the initial setting. The accumulation value reference value is used as the reference of brightness for causing an X-ray image to have an appropriate image quality. Furthermore, an accumulated pixel number reference value is set to be a predetermined value "SUMNUMconst." The accumulated pixel number reference value is used as the reference of the pixel number in the CCD sensor and for causing an X-ray image to have an appropriate image quality. An accumulated pixel number variable showing the current count number of the accumulated pixel number is indicated by "SUMNUMx."

In STEP 11, in order to acquire the initial considered pixel of the accumulated digital image signal 124, the accumulated pixel number variable "SUMNUMx" is cleared to 0.

Next, it is judged in STEP 12 whether the accumulated pixel value which is the currently considered accumulated pixel value is larger than the accumulated pixel value reference value "SUMVALconst" or not. If the accumulated pixel value of the considered pixel is larger than the accumulated pixel value reference value "SUMVALconst," the accumulated pixel number variable "SUMNUMx" is incremented in STEP 13 by one, and the process then proceeds to STEP 14.

By contrast, if the accumulated pixel value of the considered pixel is not larger than the accumulated pixel value reference value "SUMVALconst," the process then directly proceeds to STEP 14.

In STEP 14, it is judged whether the pixel values of all the pixels have been checked or not. If the operation of checking the pixel values of all the pixels is not ended, the next considered pixel of the accumulated digital image signal 124 is acquired in STEP 15, and the loop directed to STEP 12 is then repeated.

By contrast, if it is judged in STEP 14 that the pixel values of all the pixels have been checked, the process is transferred to the accumulated pixel number detection circuit 128 (FIG. 11) of the accumulation value detection unit 106.

The accumulated pixel number detection circuit 128 of the accumulation value detection unit 106 judges in STEP 16 whether the accumulated pixel number variable "SUMNUMx" is larger than the accumulated pixel number reference value "SUMNUMconst" or not.

If the accumulated pixel number variable "SUMNUMx" is smaller in STEP 16 than the accumulated pixel number reference value "SUMNUMconst," accumulation of image data is continued in STEP 17, and the process returns to STEP 12 to repeat the loop.

By contrast, if the accumulated pixel number variable "SUMNUMx" is larger in STEP 16 than the accumulated pixel number reference value "SUMNUMconst," accumulation of image data is stopped in STEP 18. At this time, the accumulated pixel number detection circuit 128 sends the accumulation stop flag 129 to the accumulation stop circuit 130, and simultaneously the display instruction flag 132 to the display instruction circuit 133.

When the accumulation stop circuit 130 receives the accumulation stop flag 129, the circuit supplies the accumulation stop instruction signal 131 to the accumulation value calculation circuit 123. Upon receiving the accumulation stop instruction signal 131, the accumulation value calculation circuit 123 stops the processes of accumulating the digital image signal 117 and storing the accumulated signal into the frame memory 125.

When the display instruction circuit 133 receives the display instruction flag 132 from the accumulated pixel number detection circuit 128, the circuit 133 sends the display instruction signal 134 to the CPU 135. Upon receiving the display instruction signal 134, the CPU 135 acquires in STEP 19 of the flow shown in FIG. 13 the digital image data for display 126 from the frame memory 125, and the image data are displayed in STEP 20 on the image display device 137 such as a CRT. As required, the image data are stored into the recording medium 140.

As seen from the above description, in the X-ray imaging apparatus of the third embodiment of the present invention, when the number of pixels having a pixel value larger than a predetermined value upon exposure of X-rays is larger than a predetermined number, it is judged that X-ray exposure is started, and accumulation of image data is then started. In the X-ray imaging apparatus of the third embodiment, when the number of pixels having an accumulated pixel value larger than a predetermined value is larger than a predetermined number, accumulation is stopped. Therefore, the X-ray imaging apparatus of the third embodiment can automatically obtain an optimum X-ray image without requiring the input and output units to be connected to the X-ray exposure apparatus and irrespective of the output control of the exposure apparatus.

<Fourth Embodiment>

Figure 14:
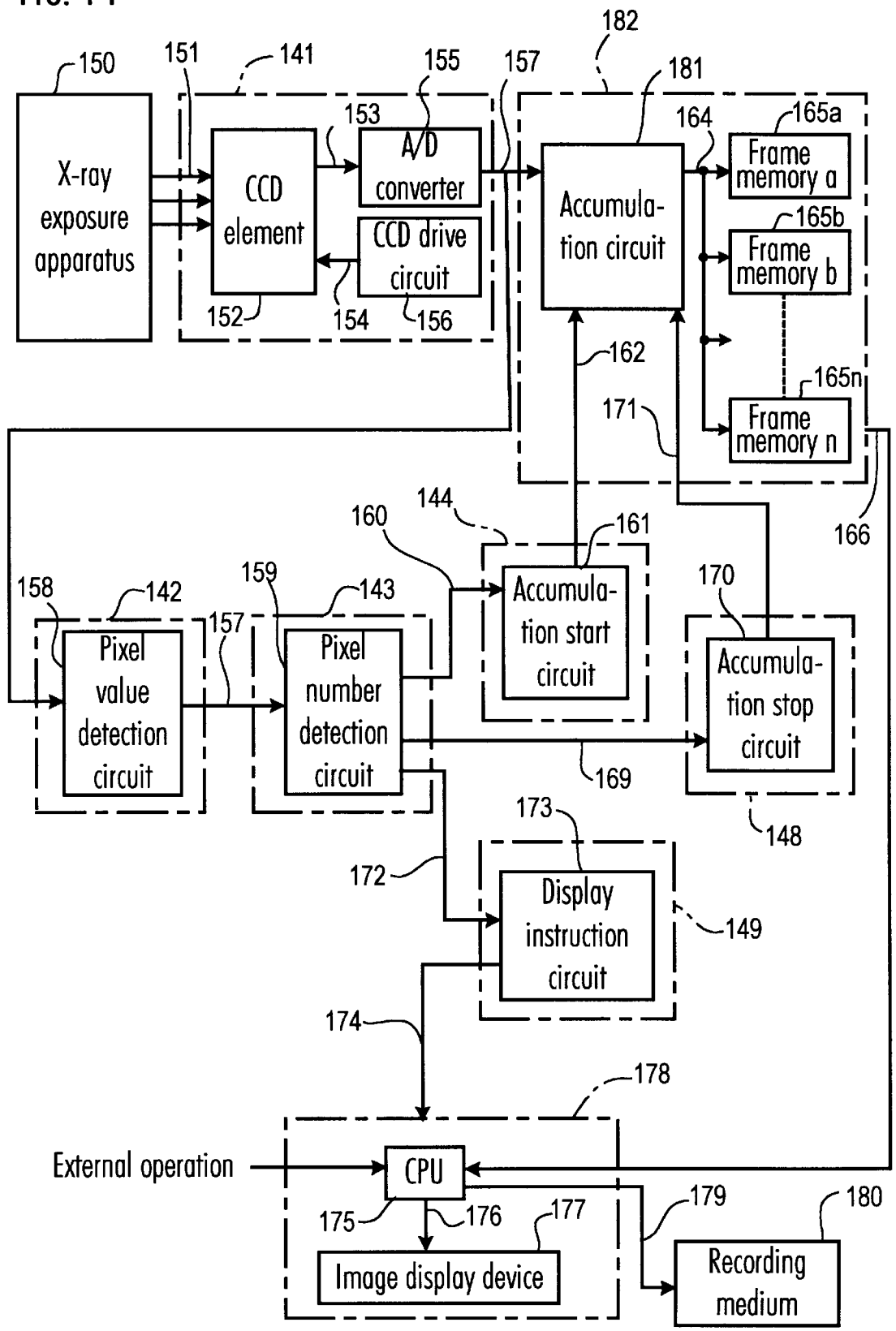
FIG. 14 is a block diagram showing the whole configuration of an X-ray imaging apparatus of a fourth embodiment of the present invention.
Figure 15:
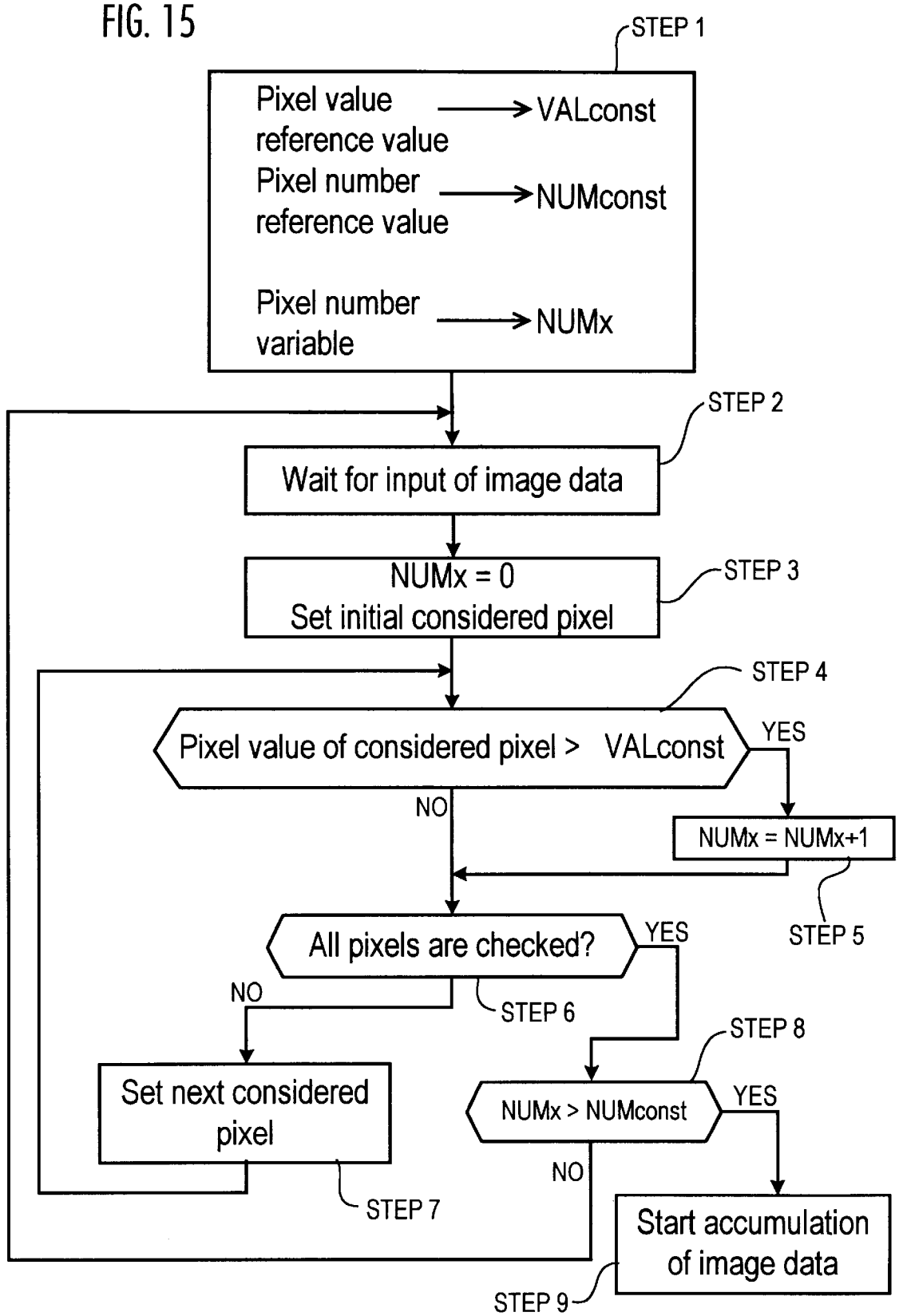
FIG. 15 shows a flow of a procedure conducted from the start of exposure to the start of accumulation in the X-ray imaging apparatus of the fourth embodiment.
Figure 16:
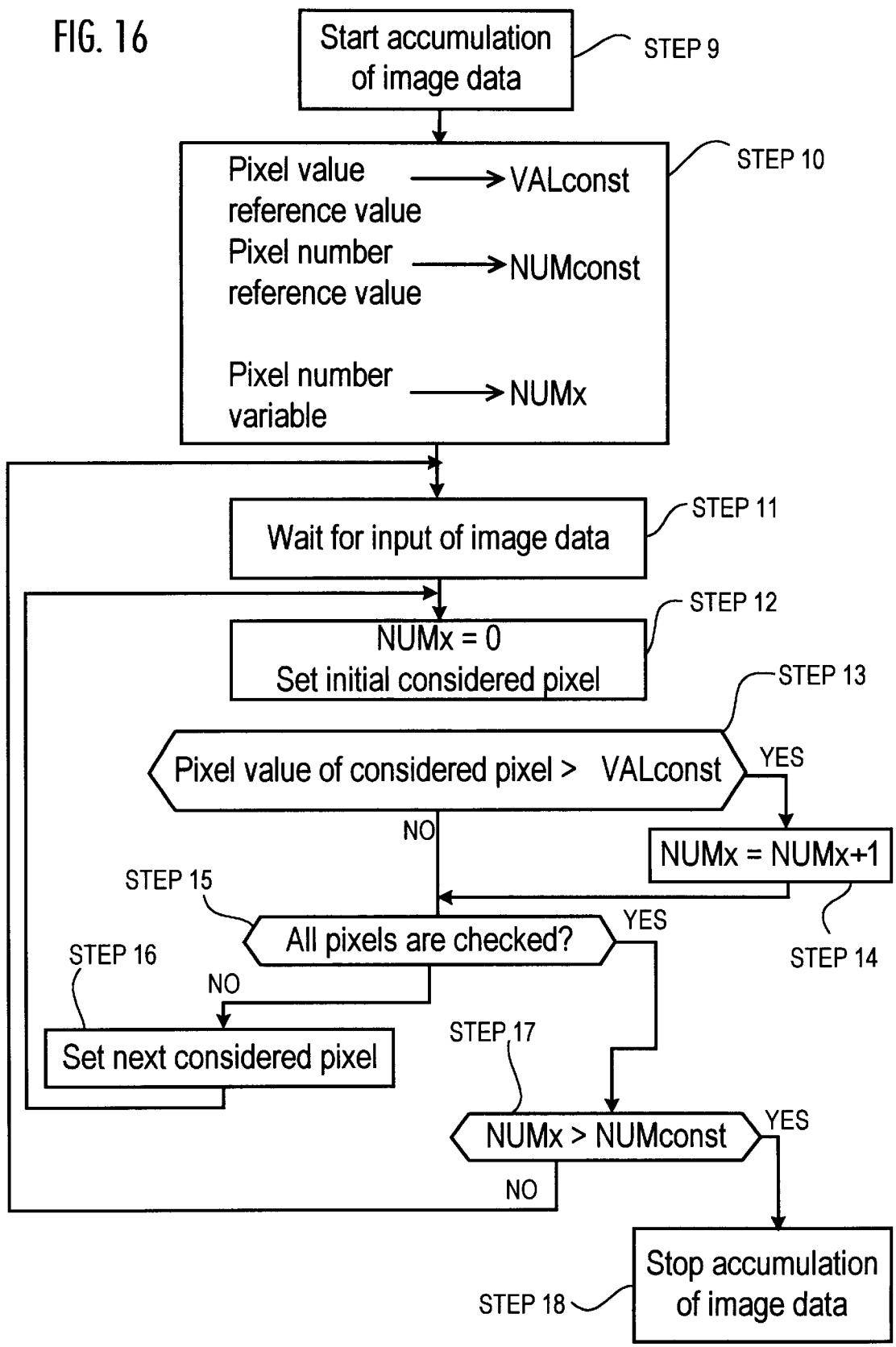
FIG. 16 shows a flow of a procedure conducted from the start of accumulation to the stop of accumulation in the X-ray imaging apparatus of the fourth embodiment.
Figure 17:
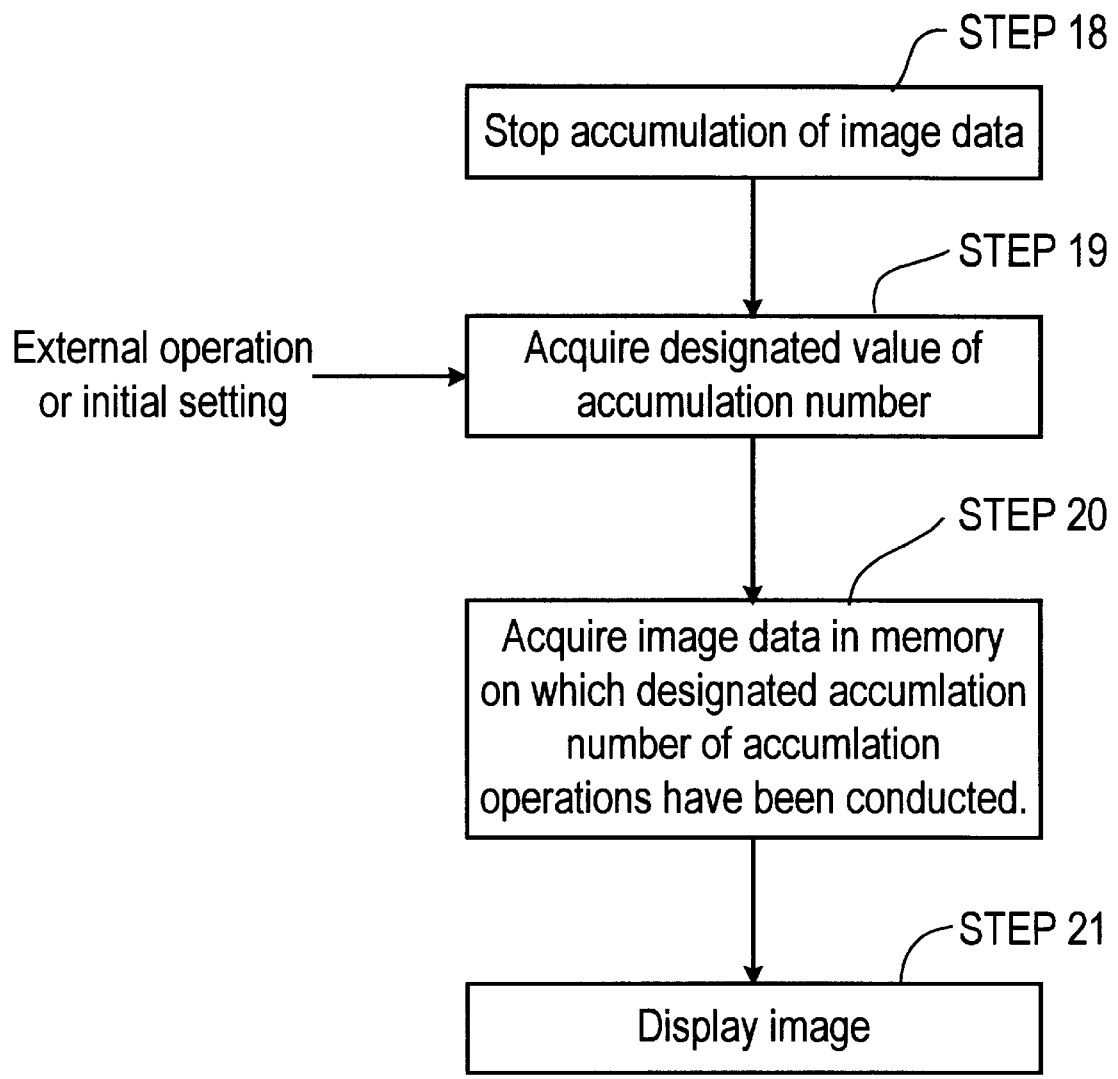
FIG. 17 shows a flow of a procedure conducted from the stop of accumulation to the display of an image in the X-ray imaging apparatus of the fourth embodiment.

Hereinafter, a fourth embodiment of the X-ray imaging apparatus of the present invention will be described with reference to the accompanying drawings. FIG. 14 is a block diagram showing the whole configuration of the X-ray imaging apparatus of the fourth embodiment, FIG. 15 shows a flow of a procedure conducted from the start of exposure to the start of accumulation in the X-ray imaging apparatus of the fourth embodiment, FIG. 16 shows a flow of a procedure conducted from the start of accumulation to the stop of accumulation in the X-ray imaging apparatus of the fourth embodiment, and FIG. 17 shows a flow of a procedure conducted from the stop of accumulation to the display of an image in the X-ray imaging apparatus of the fourth embodiment.

Referring to FIG. 14, X-rays 151 which have been irradiated from an X-ray exposure apparatus 150 and transmitted through a diseased part that is the exposure object enter a CCD element 152 of an X-ray detection unit 141. The X-ray detection unit 141 comprises the CCD element 152, an A/D converter 155, and a CCD driver 156, and outputs a digital image signal 157. An accumulation unit 182 to which the digital image signal 157 is supplied comprises an accumulation circuit 181 and plural frame memories 165a, 165b, 165c, . . . , 165n.

The CCD element 152 which serves as image data outputting means converts the X-rays 151 into an analog image signal 153, and outputs the signal to the A/D converter 155. The A/D converter 155 supplies the digital image signal 157 to the accumulation circuit 181 of the accumulation unit 182, and also to a pixel value detection circuit 158 of a pixel value detection unit 142. The output of the pixel value detection circuit 158 is supplied to a pixel number detection circuit 159 of a pixel number detection unit 143, and then to the accumulation circuit 181 via an accumulation start circuit 161 of an accumulation start unit 144. The pixel number detection circuit 159 supplies an accumulation stop flag 169 to an accumulation stop circuit 170 of an accumulation stop unit 148, and the accumulation stop circuit 170 supplies an accumulation stop instruction signal 171 to the accumulation circuit 181. The pixel number detection circuit 159 supplies also a display instruction flag 172 to a display instruction circuit 173 of a display instruction unit 149.

The output of the accumulation unit 182 is supplied to a CPU 175 of an image display unit 178. The image display unit 178 connected to the accumulation unit 182 has the CPU 175 which controls the image acquisition and the image display in accordance with external operations, and an image display device 177 which displays image data. The image data are recorded on a recording medium 180 on the basis of instructions from the CPU 175.

In FIG. 14, the arrows indicate the X-rays 151 and the flows of the signals, the numeral 154 indicates a CCD driving signal, the numeral 160 indicates an accumulation start flag, the numeral 162 indicates an accumulation start instruction signal, the numeral 164 indicates an accumulated digital image signal, the numeral 166 indicates digital image data for display, the numeral 169 indicates an accumulation stop flag, the numeral 174 indicates a display instruction signal, the numeral 176 indicates an image display signal, and the numeral 179 indicates digital image data for storage.

Next, the operation of the X-ray imaging apparatus of the fourth embodiment will be described.

First, a diseased part or the like which is an exposure object is irradiated with the X-rays 151 emitted from the X-ray exposure apparatus 150, and the CCD element 152 then supplies the analog image signal 153 corresponding to the image, to the A/D converter 155. The A/D converter 155 supplies the digital image signal 157 to the accumulation circuit 181 of the accumulation unit 182, and also to the pixel value detection circuit 158 of the pixel value detection unit 142.

FIG. 15 shows a flow of a procedure conducted from the start of exposure to the start of accumulation in the X-ray imaging apparatus of the fourth embodiment. In STEP 1 of the flow shown in FIG. 15, the pixel value detection circuit 158 sets a pixel value reference value to be a predetermined value "VALconst" as the initial setting. The pixel value reference value is used as the reference of brightness for judging that the X-ray exposure is conducted. A pixel number reference value is set to be a predetermined value "NUMconst." The pixel number reference value is used as the reference of the pixel number in the CCD sensor and for judging that the X-ray exposure is conducted. A pixel number variable is indicated by "NUMx."

In STEP 2, the process enters the state of waiting for an input of image data. In STEP 3, in order to acquire the initial pixel of the digital image signal 157, the pixel number variable "NUMx" is cleared to 0.

Next, it is judged in STEP 4 whether the pixel value of the currently considered pixel is larger than the pixel value reference value "VALconst" or not. If the pixel value of the considered pixel is larger than the pixel value reference value "VALconst," the pixel number variable "NUMx" is incremented in STEP 5 by one, and the process then proceeds to STEP 6.

By contrast, if the pixel value of the considered pixel is not larger in STEP 4 than the pixel value reference value "VALconst," the process then directly proceeds to STEP 6.

In STEP 6, it is judged whether the pixel values of all the pixels have been checked or not. If it is judged that the operation of checking the pixel values of all the pixels is not ended, the next considered pixel of the digital image signal 157 is set in STEP 7 so as to be acquired, and the process returns to STEP 3 so that this loop is repeated.

By contrast, if it is judged in STEP 6 that the pixel values of all the pixels have been checked, the process conducted by the pixel value detection circuit 158 (FIG. 14) is terminated, and the process is transferred to the pixel number detection circuit 159 (FIG. 14).

The pixel number detection circuit 159 judges in STEP 8 of the flow of FIG. 15 whether the pixel number variable "NUMx" is larger than the pixel number reference value "NUMconst" or not. If the pixel number variable "NUMx" is larger than the pixel number reference value "NUMconst," accumulation of image data is started in STEP 9. At this time, the pixel number detection circuit 159 sends the accumulation start flag 160 to the accumulation start circuit 161 (FIG. 14).

By contrast, if the pixel number variable "NUMX" is not larger than the pixel number reference value "NUMconst," the process returns to STEP 2 and this loop is repeated.

Upon receiving the accumulation start flag 160, the accumulation start circuit 161 supplies the accumulation start instruction signal 162 to the accumulation circuit 181. When the accumulation circuit 181 receives the accumulation start instruction signal 162, the circuit converts the digital image signal 157 which is thereafter periodically transmitted, into the accumulated digital image signal 164, and independently stores the accumulated digital image signal into the frame memories 165a to 165n. Specifically, when the digital image signal 157 is supplied only one time, the signal is stored into the frame memory 165a. When the digital image signal 157 is accumulated two times, the accumulated signal is stored into the frame memory 165b, and, when the digital image signal is accumulated three times, the accumulated signal is stored into the frame memory 165c, so that the accumulated signals are separately stored into the respective memories. When the digital image signal 157 is accumulated N times, the accumulated signal is stored into the frame memory 165n.

Therefore, frame memories the number of which is equal to the possible maximum number of accumulation operations must be prepared. The X-ray exposure time is about 1 second at the longest, and one frame memory can store data for about 0.1 seconds. Therefore, it is sufficient for the apparatus to prepare about 10 to 20 frame memories. The apparatus is configured so that, when the frame memories lack, the contents of the last memory are updated.

The CCD sensor used in the fourth embodiment is configured as shown in FIGS. 25 and 26. The CCD sensor always outputs at a constant period the analog image signal containing image data of all the pixels. The image data of all the pixels are A/D converted at each period, thereby obtaining the digital image signal 157. The digital image signal 157 is accumulated and then stored into a suitable frame memory, with the result that image data having an appropriate image quality are obtained. The configuration and the like of the CCD sensor are the same as those of the third embodiment.

When accumulation of the digital image signal 157 is started, the pixel value detection circuit 158 and the pixel number detection circuit 159 conduct the process of judging whether the X-ray exposure is terminated or not, in accordance with the procedure of FIG. 16.

FIG. 16 shows a flow of the procedure conducted from the start of accumulation to the stop of accumulation in the X-ray imaging apparatus of the fourth embodiment.

In the flow shown in FIG. 16, the processes of STEPs 10 to 16 are the same as those of STEPs 1 to 7 of FIG. 15 described above.

In STEP 17 of FIG. 16, the pixel number detection circuit 159 judges whether the pixel number variable "NUMx" is smaller than the pixel number reference value "NUMconst" or not. If the pixel number variable "NUMx" is smaller than the pixel number reference value "NUMconst," accumulation of image data is stopped in STEP 18. At this time, the pixel number detection circuit 159 sends the accumulation stop flag 169 to the accumulation stop circuit 170, and simultaneously the display instruction flag 172 to the display instruction circuit 173.

By contrast, if the pixel number variable "NUMx" is larger in STEP 17 than the pixel number reference value "NUMconst," the process directly proceeds to STEP 11 and waits for an input of the next image data.

When the accumulation stop circuit 170 receives the accumulation stop flag 169, the circuit supplies the accumulation stop instruction signal 171 to the accumulation circuit 181. Upon receiving the accumulation stop instruction signal 171, the accumulation circuit 181 stops the operation of storing the accumulated digital image signal 164 into the frame memories 165a to 165n.

When the display instruction circuit 173 receives the display instruction flag 172, the circuit supplies the display instruction signal 174 to the CPU 175. FIG. 17 shows a flow of a procedure conducted from the stop of accumulation to the display of an image in the X-ray imaging apparatus of the fourth embodiment. When the CPU 175 receives the display instruction signal 174, the designated value of the accumulation number which is predetermined in response to an external operation or initial setting is acquired in STEP 19 of the flow shown in FIG. 17. The value is set in accordance with an empirical knowledge of the operator, or in the initial setting operation in consideration of relationships between the apparatus and the X-ray exposure apparatus, so as to be always appropriate.

Next, the digital image data for display 166 is acquired in STEP 20 of FIG. 17 from the memory into which the accumulated image data for the designated accumulation number are stored, among the frame memories 165a to 165n, and the image data are displayed on the image display device 177 such as a CRT. As required, the image data are stored into the recording medium 180.

The X-ray imaging apparatus of the fourth embodiment may be configured in the following manner. In order to determine the designated value of the accumulation number, the image data for all numbers which are stored in the frame memories 165a to 165n are once displayed in parallel on the image display device such as a CRT, and the operator determines the value in accordance with the most appropriate one of the displayed images.

When one accumulation number at which an optimum image quality is obtained can be predetermined, the X-ray imaging apparatus of the fourth embodiment can be configured by using only one frame memory, with the result that the apparatus is economically superior.

As seen from the above description, the X-ray imaging apparatus of the fourth embodiment of the present invention is configured so that, when the number of pixels having a pixel value larger than a predetermined value is larger than a predetermined number at exposure of X-rays, it is judged that X-ray exposure is started and accumulation of image data is then started, and, when plural accumulation values are stored and the number of pixels having a pixel value larger than a predetermined value is reduced to be smaller than the predetermined number, accumulation is stopped. Therefore, the X-ray imaging apparatus of the fourth embodiment can obtain an optimum image quality without requiring the input and output units to be connected to the X-ray exposure apparatus and irrespective of the output control of the X-ray exposure apparatus.

<Fifth Embodiment>

Figure 18:
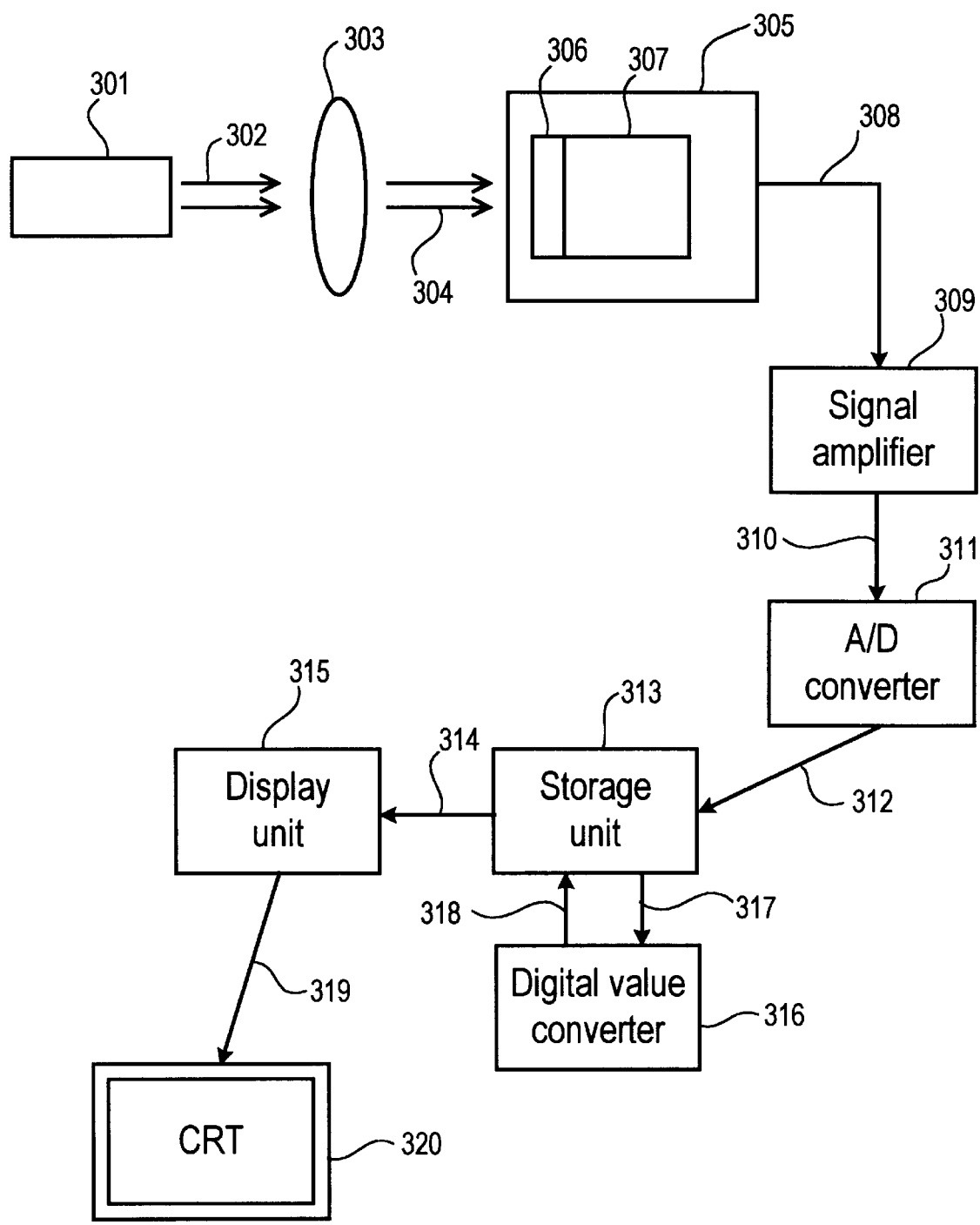
FIG. 18 is a block diagram showing the whole configuration of an X-ray imaging apparatus of a fifth embodiment of the present invention.
Figure 19:
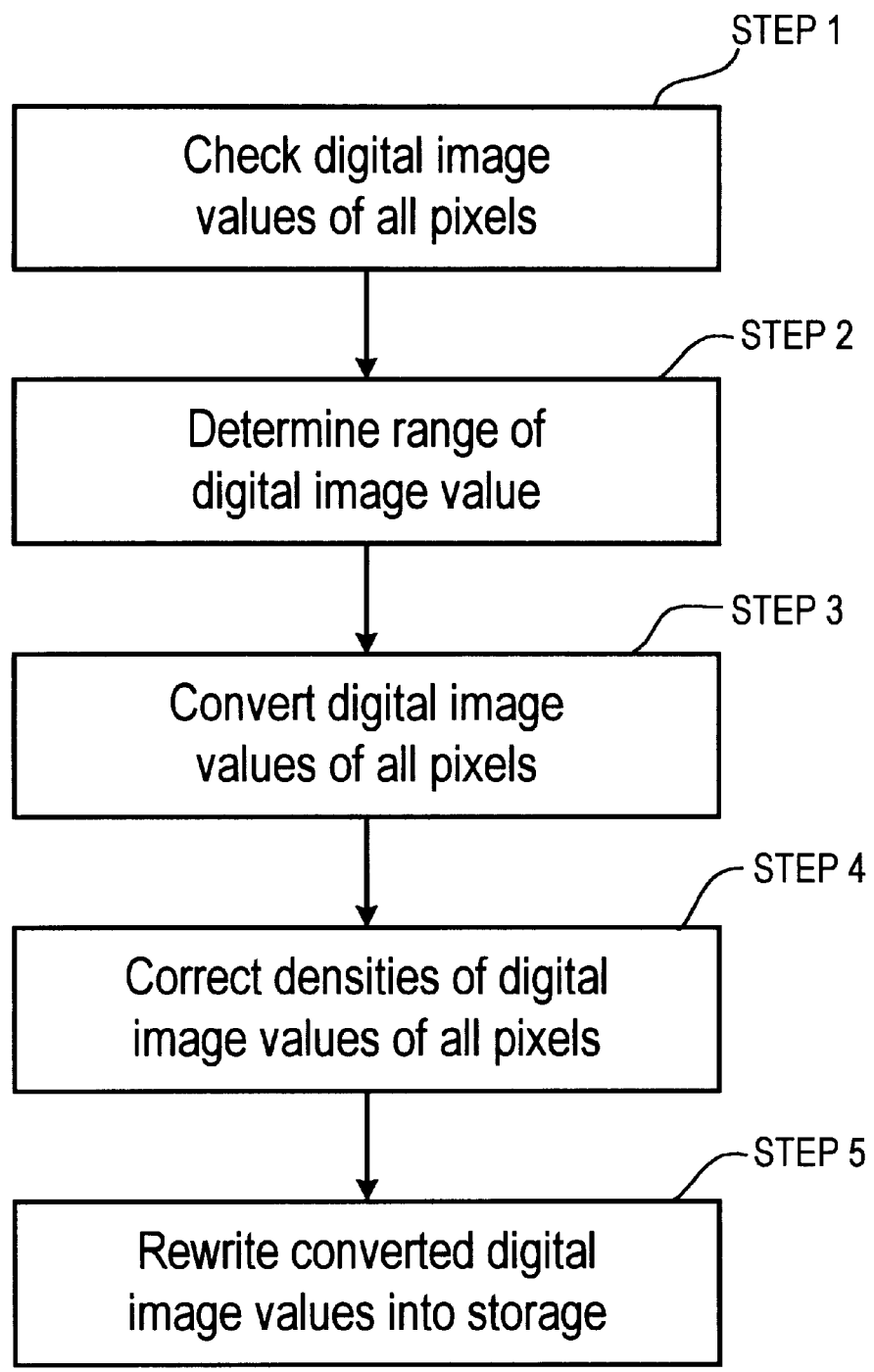
FIG. 19 shows a flow of an operation procedure of a digital value converter in the X-ray imaging apparatus of the fifth embodiment.
Figure 20:
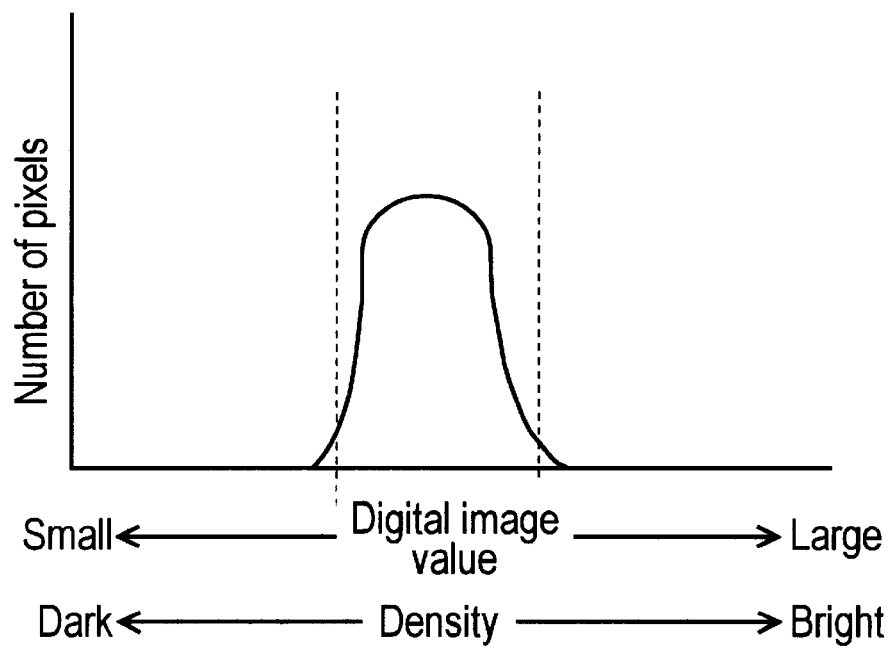
FIG. 20 is a graph showing the pixel distribution of digital image values of all the pixels in the X-ray imaging apparatus of the fifth embodiment.
Figure 21:
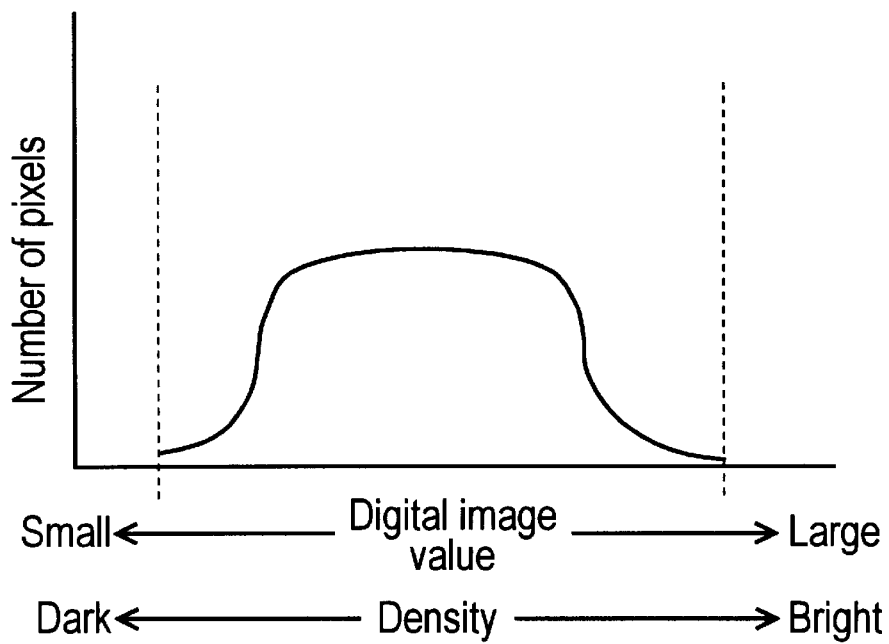
FIG. 21 is a graph showing the pixel distribution of digital image values after conversion of digital image values of all the pixels in the X-ray imaging apparatus of the fifth embodiment.
Figure 22:
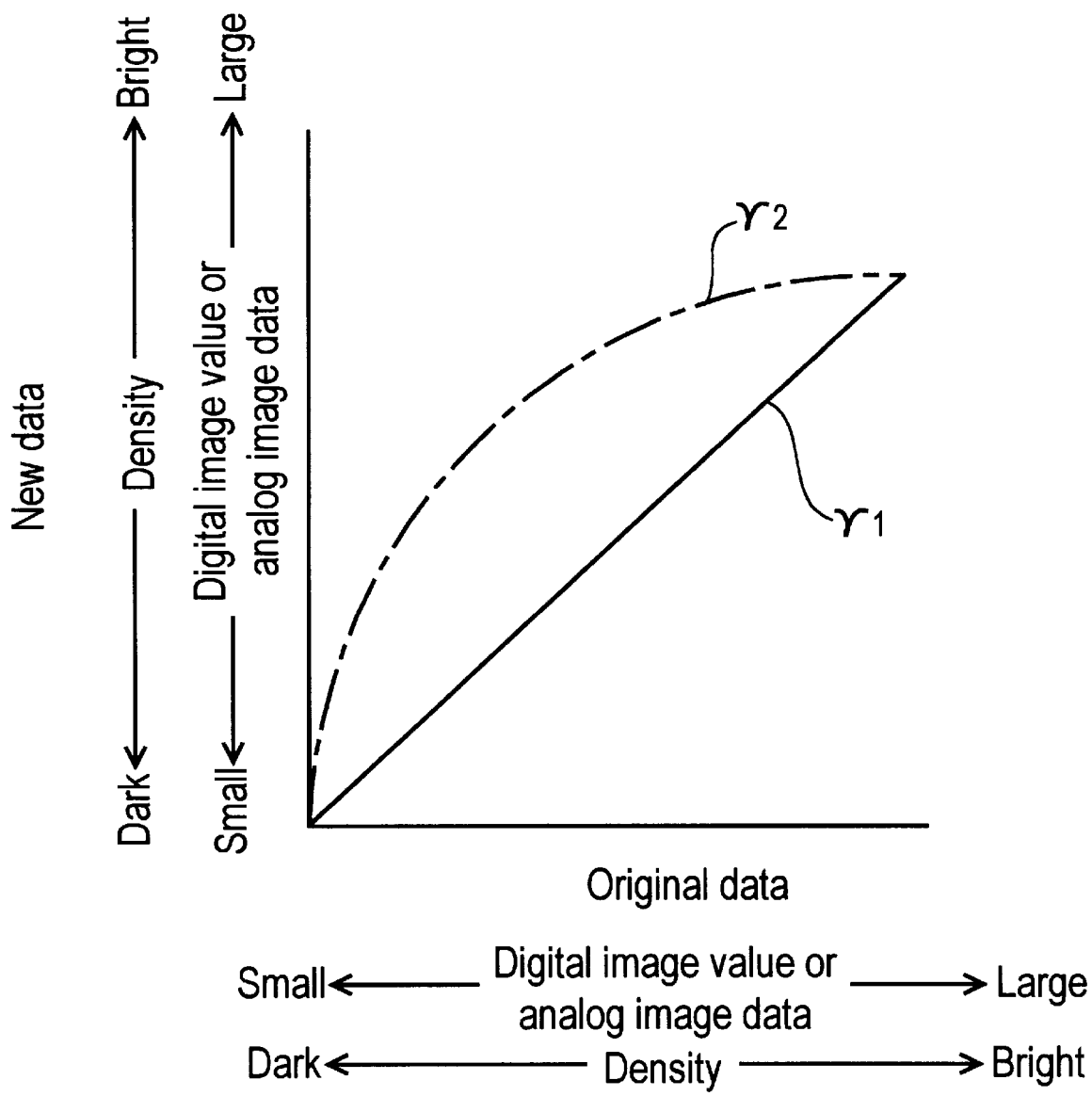
FIG. 22 is a graph showing conversion characteristics for forming an image in accordance with the display purpose or an image which is easy to see in the X-ray imaging apparatus of the fifth embodiment.
Figure 23:
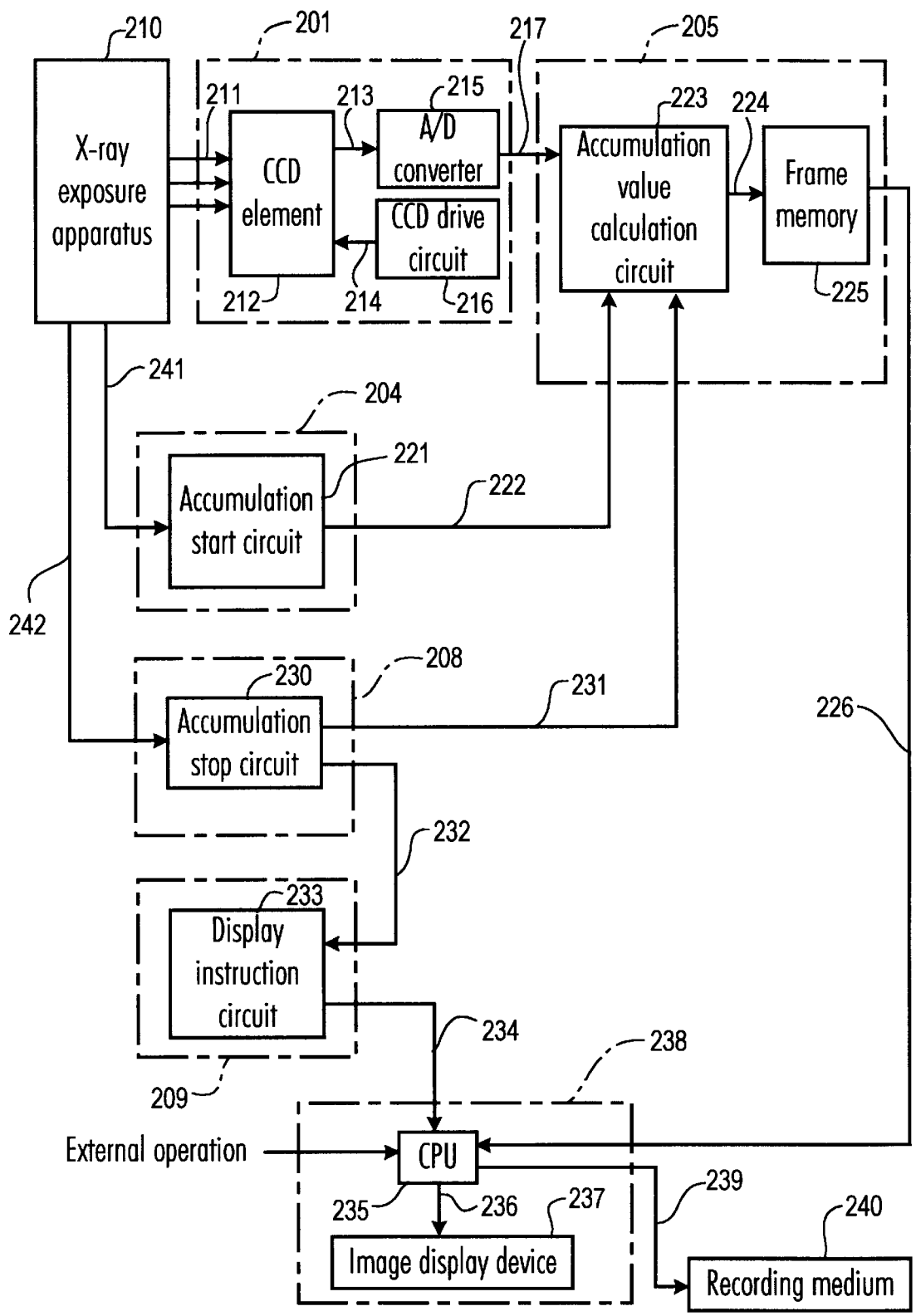
FIG. 23 is the block diagram showing the whole configuration of the conventional X-ray imaging apparatus.
Figure 24:
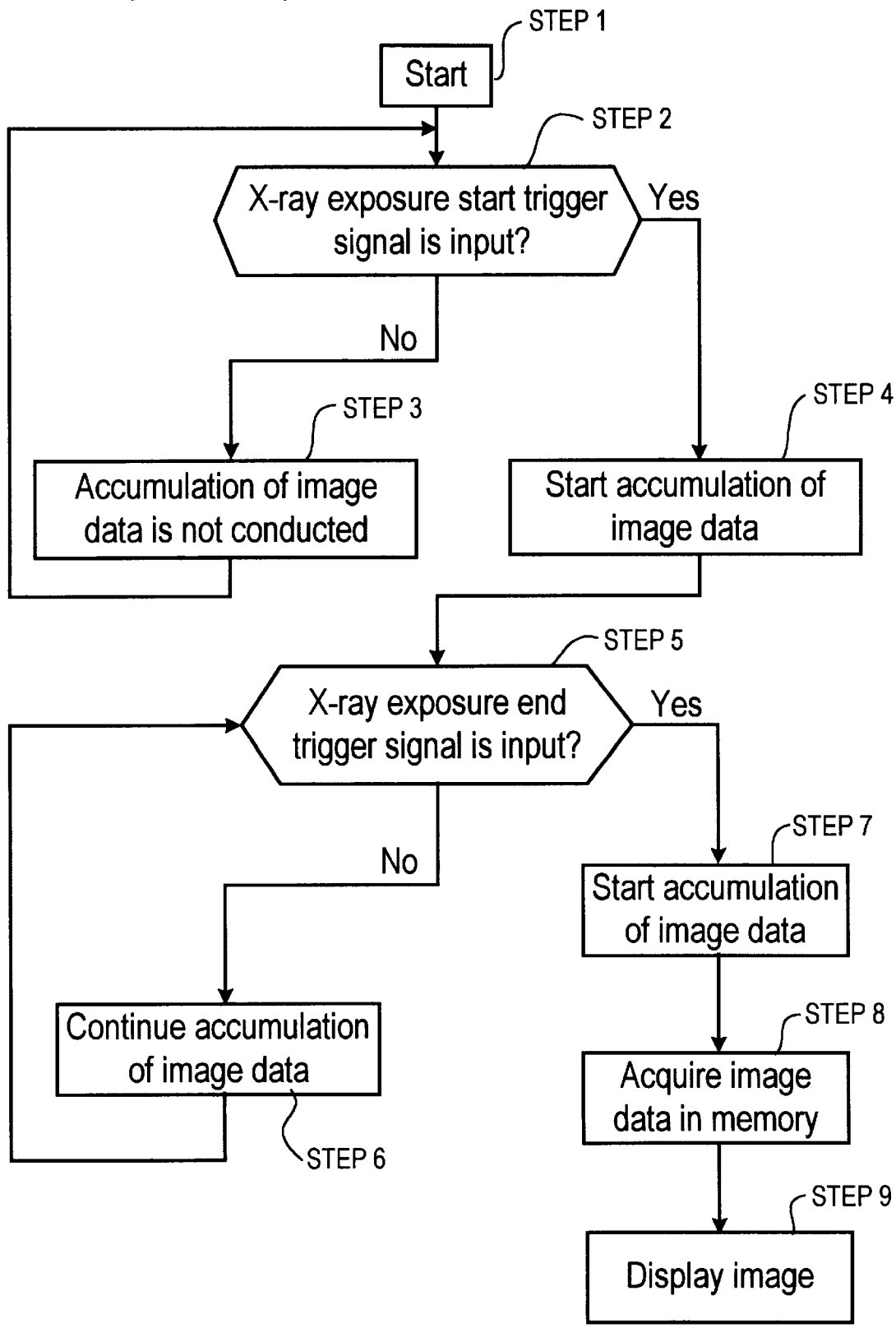
FIG. 24 shows the flow of the procedure conducted from the start of exposure to the display of an image in the conventional X-ray imaging apparatus.

Hereinafter, a fifth embodiment of the X-ray imaging apparatus of the present invention will be described with reference to the accompanying drawings. FIG. 18 is a block diagram showing the whole configuration of an X-ray imaging apparatus of the fifth embodiment of the present invention, FIG. 19 shows a flow of an operation procedure of digital value converting means in the X-ray imaging apparatus of the fifth embodiment, FIG. 20 shows the pixel distribution of digital image values of all the pixels, FIG. 21 shows the pixel distribution of digital image values after conversion of digital image values of all the pixels in the case where the pixel range is changed, and FIG. 22 is a view showing conversion characteristics for forming an image which corresponds to the display purpose or which is easy to see.

Referring to FIG. 18, an X-ray exposure apparatus 301 irradiates an exposure object 303 with X-rays 302, and X-rays 304 transmitted through the exposure object 303 enter signal outputting means 305. The signal outputting means 305 supplies an analog image signal 308 corresponding to the intensity of the X-rays 304, to a signal amplifier 309.

The signal outputting means 305 comprises a fluorescent member 306 (a scintillator made of, for example, $Gd_2O_2S$) which converts X-rays into visible light, and a CCD sensor 307 which converts visible light into electric charges and transfers the electric charges. In accordance with the amount of light entering the pixels of the CCD sensor 307, the analog image signal 308 is formed, and the CCD sensor 307 outputs the analog image signal 308 for all the pixels. In this way, the signal outputting means 305 is configured so as to supply the analog image signal 308 corresponding to the intensity of the X-rays, to the signal amplifier 309 which serves as signal amplifying means.

In the X-ray imaging apparatus of the present invention, in place of the fluorescent member 306, a cadmium telluride detecting element (CdTe detecting element) which is electrically connected to each pixel of the CCD sensor may be disposed on the surface of the CCD.

The signal amplifier 309 amplifies the input analog image signal 308 to a level required for A/D conversion. The amplified analog image signal 310 is supplied to an A/D converter 311 which serves as A/D converting means.

The A/D converter 311 converts the analog image signal 310 into a digital value and then supplies the digital image value 312 to a storage unit 313 which serves as storing means. In the A/D converter 311, the analog image signal 310 which have been output in accordance with the exposure amount of the X-rays 304 transmitted through the exposure object is digitized. The storage unit 313 stores the digital image value 312. At this time, while adding data for each short time during X-ray exposure each other, the A/D converter 311 causes the data to be stored into the storage unit 313. The storage unit 313 has a capacity which is several times the resolution of the A/D converter 311. Therefore, the storage unit 313 can hold image data of a higher-level gray scale.

A digital value converter 316 which serves as digital value converting means converts the stored digital image values 317 into digital image values for display 318 while correcting the image values. The digital image values for display are stored into the storage unit 313.

The digital image values for display 318 of the storage unit 313 are supplied as digital values for display 314 to a display unit 315 which serves as displaying means. The display unit 315 supplies an image display signal 319 to a display device 320 such as a CRT, so that the image display signal 319 is displayed thereon.

Since image data of a higher-level gray scale are held by the storage unit 313 having a capacity which is larger than the resolution of the A/D converter 311, the X-ray imaging apparatus of the fifth embodiment is an apparatus in which conditions in X-ray exposure can be easily set.

Next, a specific example of the digital value converter 316 shown in FIG. 18 will be described with reference to the flow of FIG. 19 showing the operation procedure, and the graph of FIG. 20 showing the pixel distribution of digital image values of all the pixels. FIG. 20 shows the state of the image density in image data.

In STEP 1 of the flow shown in FIG. 19, the digital value converter 316 acquires the digital image values 317 of all the pixels which have been once stored into the storage unit 313, and checks the pixel number in the digital image values 317.

Next, the state of pixel distribution (the density state) such as shown in FIG. 20 is grasped in STEP 2 from the checked digital image values 317. From the state of pixel distribution (the density state), an appropriate pixel distribution range of the digital image values 317 is determined. In accordance with the use of the X-ray imaging apparatus, the appropriate pixel distribution range of the digital image values 317 is predetermined so that a predetermined number of higher and lower values of the digital image values 317 are eliminated or a predetermined rate of such values is eliminated.

In STEP 3 of the flow shown in FIG. 19, conversion of the digital image values 317 of all the pixels is executed so that the pixel distribution range of the digital image values 317 which is determined in STEP 2 is widened as shown in FIG. 21. FIG. 21 is a graph showing an example of the digital image values 317 which are changed to an appropriate pixel distribution range.

Next, an example of the method of converting the maximum and minimum values of the digital image values 317 into the maximum and minimum values of the digital image values for display 318 will be described. The maximum and minimum values of the digital image values 317 which can be detected from the pixel distribution state are indicated by "Bmax" and "Bmin," respectively, and the maximum and minimum values of the digital image values for display 318 are indicated by "Hmax" and "Hmin," respectively. When the digital image values 317 before conversion are indicated by "Bdata" and the digital image values for display 318 after conversion are indicated by "Hdata," conversion of the digital image values 317 of all the pixels is executed by the following expression:

Hdata=$a$×Bdata/$b$−$c$/$b$ where a=Hmax−Hmin,
b=Bmax−Bmin, and
c=Hmax×Bmin−Hmin×Bmax.

As seen from the above expression, there is a fear that, when conversion for widening the pixel distribution range is conducted, the resolution of an image is impaired. However, this fear can be eliminated by increasing the resolution of the A/D converter 311 so as to be higher than the gray scale of the display device such as a CRT.

When the capacity of the storage unit 313 is increased and the gray scale of each pixel is made higher than the resolution of the A/D converter 311, the margin for the data saturation in the storage unit 313 can be increased.

Next, a specific method of correcting the density will be described.

FIG. 22 is a view showing conversion characteristics for forming an image in accordance with the display purpose or an image which is easy to see.

In STEP 4 of the flow shown in FIG. 19, density correction is conducted on the digital image value of all the pixels as shown in FIG. 22 in accordance with the display purpose. In the conversion characteristics shown in FIG. 22, the operation of changing the level of a digital image value is strictly identical with that of changing brightness or density of an image.

When the inspector observing the X-ray image wishes to see a bright portion, conversion is conducted in accordance with characteristics of γ1 (FIG. 22) which are approximately linear. By contrast, when the inspector wishes to see a dark portion, conversion is conducted in accordance with characteristics of γ2 (FIG. 22) which widen the range of a dark portion.

Next, in STEP 5, the converted digital image values for display 318 are replaced with the original digital image values 317 in the storage unit 313, and the replaced digital image values are stored into the storage unit 313.

Furthermore, the display unit 315 controls the display device 320 such as a CRT so that the updated digital values for display 314 in the storage unit 313 are displayed on the display device.

In this way, the X-ray imaging apparatus of the fifth embodiment of the present invention can widen the brightness range of an image to be displayed, and obtain an image of a visually high level in accordance with conversion characteristics corresponding to the display purpose.

In the X-ray imaging apparatus of the fifth embodiment, the time and the distance for X-ray exposure can be set without difficulty and conditions can be easily set. Therefore, the apparatus is easy to operate. Also the configuration in which image data of a higher-level gray scale are held by storing means having a capacity which is larger than the resolution of A/D converting means further enhances the easiness of the condition setting. Accordingly, the condition setting for X-ray exposure is facilitated.

<Sixth Embodiment>

Hereinafter, a sixth embodiment of the X-ray imaging apparatus of the present invention will be described. In the X-ray imaging apparatus of the sixth embodiment, the signal amplifier 309 which is used in the X-ray imaging apparatus of the fifth embodiment and serves as signal amplifying means is modified.

In the X-ray imaging apparatus of the sixth embodiment of the present invention, the signal amplifier 309 (FIG. 18) which is used in the X-ray imaging apparatus of the fifth embodiment is modified so that, as the analog image signal is lower in level, amplification is conducted at a higher degree, and, as the analog image signal is higher in level, amplification is conducted at a lower degree. For example, the amplifier has conversion characteristics of γ2 shown in FIG. 22. Namely, the amplifier outputs the analog image signal in such a manner that a signal of a lower level or obtained from a portion through which X-rays transmit more hardly is amplified at a larger amplification factor and a darker portion has a wider density range. The analog image signal is A/D converted into a digital value by the A/D converting means and then displayed on the display device 320 (FIG. 18) such as a CRT in the same manner as the X-ray imaging apparatus of the fifth embodiment of the present invention.

In the thus configured X-ray imaging apparatus of the sixth embodiment, a dark image portion can be displayed more finely than a bright image portion and an image of a visually high level can be obtained.

In the X-ray imaging apparatus of the sixth embodiment, the time and the distance for X-ray exposure can be set without difficulty and conditions for X-ray exposure can be easily set. Therefore, the apparatus is easy to operate. Also the configuration in which image data are held by storing means having a capacity which is several times the resolution of A/D converting means further enhances the easiness of the condition setting.

As seen from the above description, in the X-ray imaging apparatus of the present invention, when the pixel value of a designated pixel is larger by a predetermined value or more than the value of a pixel which has the maximum value among the surrounding pixels, the designated pixel is judged as an abnormal data. Consequently, judgement of an abnormal data can be surely performed and a process of correcting image data can be accurately conducted.

In the X-ray imaging apparatus of the present invention, an abnormal data is detected by using the luminance distribution of a predetermined number of pixels among image data stored in the image data storing means. Even when abnormal data continuously exist, therefore, a process of correcting image data can be accurately conducted.

The X-ray imaging apparatus of the present invention can obtain an optimum image quality without adjusting the output of an X-ray exposure apparatus.

According to the X-ray imaging apparatus of the present invention, when X-ray exposure of an optimum image quality is obtained, the optimum image quality can be maintained without stopping the X-ray exposure.

The X-ray imaging apparatus of the present invention can automatically display an image of an optimum image quality.

According to the X-ray imaging apparatus of the present invention, an image which is most suitable for a part to be diagnosed or the diagnosis method, from the accumulation values for plural accumulations.

According to the X-ray imaging apparatus of the present invention, X-ray exposure can be judged whether it is appropriate or not, and accumulation can be automatically started.

In the X-ray imaging apparatus of the present invention, when the signal outputting means receives X-rays and outputs an analog image signal corresponding to the intensity of the X-rays, the analog signal is A/D converted into a digital image value by the A/D converting means. A predetermined number or rate of digital values which are higher and lower in level among the digital values of plural pixels or all the pixels are eliminated, maximum and minimum values of the remaining digital values are converted into respective predetermined values, and conversion into digital values for display is conducted in accordance with conversion characteristics corresponding to the display purpose. As a result, the brightness range of a displayed image can be widened, and an image of a visually high level can be obtained in accordance with conversion characteristics corresponding to the display purpose. The X-ray imaging apparatus of the present invention is an apparatus in which the time and the distance for X-ray exposure can be set without difficulty and conditions can be easily set and which is therefore easy to operate. According to the present invention, also the configuration in which image data of a higher-level gray scale are held by storing means having a capacity which is larger than the resolution of A/D converting means further enhances the easiness of the condition setting, and the condition setting for X-ray exposure is facilitated.

In the X-ray imaging apparatus of the present invention, when the signal outputting means receives X-rays and outputs an analog image signal corresponding to the intensity of the X-rays, the signal amplifying means amplifies the analog image signal at a larger amplification factor as the level of the analog image signal is lower and at a smaller amplification factor as the level of the analog image signal is higher. Consequently, with respect to a portion through which X-rays hardly transmit, i.e., a dark portion, a signal is output in the state where the density range is further widened. The analog image signal is A/D converted and then displayed on a CRT or the like. As a result, a dark image portion can be displayed more finely than a bright portion and hence observed with the visually highest level.

The recording medium of the present invention can be used in the X-ray imaging apparatus of the present invention, and is excellent in portability and storage. When a program recorded on the recording medium is used, the X-ray imaging apparatus can produce an excellent image as a result of X-ray exposure and display the image.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An X-ray imaging apparatus comprising:

signal outputting means for receiving X-rays, and for outputting an analog image signal corresponding to an intensity of the X-rays;

signal amplifying means for amplifying the analog image signal at different amplification factors in accordance with a level of the analog image signal;

A/D converting means for converting the amplified analog image signal into a digital value;

storing means for storing the digital value of said A/D converting means; and displaying means for displaying an X-ray image on the basis of the digital value stored in said storing means, wherein, in said signal amplifying means, as the analog image signal has a lower level, the amplification factor is larger and, as the analog image signal has a higher level, the amplification factor is smaller and wherein said apparatus has conversion characteristics in which conversion is conducted so that a predetermined number or rate of digital values having levels among the plural digital values that are outside of a range are discarded and therefore not set to a predetermined value, and maximum and minimum values of the remaining digital values have respective predetermined values.

2. An X-ray imaging apparatus comprising:

signal outputting means for receiving X-rays, and for outputting an analog image signal corresponding to an intensity of the X-rays;

signal amplifying means for amplifying the analog image signal;

A/D converting means for converting the amplified analog image signal into a digital value;

storing means for storing the digital value of said A/D converting means;

digital value converting means for converting plural digital values stored in said storing means into digital values for display, in accordance with conversion characteristics corresponding to a distribution state of the plural digital values; and displaying means for displaying an X-ray image on the basis of the digital values for display, wherein said apparatus has conversion characteristics in which conversion is conducted so that a predetermined number or rate of digital values having levels that are outside of a range are eliminated, and maximum and minimum values of the remaining digital values have respective predetermined values and wherein the display is independent of the eliminated digital values.

3. An X-ray imaging apparatus comprising:

signal outputting means for receiving X-rays, and for outputting an analog image signal corresponding to an intensity of the X-rays;

signal amplifying means for amplifying the analog image signal;

A/D converting means for converting the amplified analog image signal into a digital value;

storing means for storing the digital value of said A/D converting means;

digital value converting means for converting plural digital values stored in said storing means into digital values for display, in accordance with conversion characteristics corresponding to a display purpose; and displaying means for displaying an X-ray image on the basis of the digital values for display, wherein said apparatus has conversion characteristics in which conversion is conducted so that a predetermined number or rate of digital values having levels among the plural digital values that are outside of a range are discarded and therefore not set to a predetermined value, and maximum and minimum values of the remaining digital values have respective predetermined values.

* * * * *